(12) United States Patent
Okutsu et al.

(10) Patent No.: US 7,287,934 B2
(45) Date of Patent: Oct. 30, 2007

(54) STRATUM DISPOSAL MONITORING SYSTEM

(75) Inventors: Kazuo Okutsu, Tokyo (JP); Hisashi Takamura, Tokyo (JP)

(73) Assignee: Kajima Corporation, Tokyo (JP)

(*) Notice: Subject to any disclaimer, the term of this patent is extended or adjusted under 35 U.S.C. 154(b) by 0 days.

(21) Appl. No.: 10/477,001

(22) PCT Filed: May 1, 2002

(86) PCT No.: PCT/JP02/04373

§ 371 (c)(1),
(2), (4) Date: May 10, 2004

(87) PCT Pub. No.: WO02/091393

PCT Pub. Date: Nov. 14, 2002

(65) Prior Publication Data

US 2004/0247396 A1  Dec. 9, 2004

(30) Foreign Application Priority Data

May 9, 2001   (JP) .............................. 2001-138514
Jun. 25, 2001  (JP) .............................. 2001-191028
Apr. 26, 2002  (JP) .............................. 2002-126003

(51) Int. Cl.
*G21F 9/34* (2006.01)
*B09B 1/00* (2006.01)

(52) U.S. Cl. .................................................. 405/129.5

(58) Field of Classification Search ........... 405/129.45, 405/129.5; 588/16
See application file for complete search history.

(56) References Cited

U.S. PATENT DOCUMENTS 4,708,522 A   11/1987  Bergman et al.
(Continued)

FOREIGN PATENT DOCUMENTS

DE   36 17 956 A1   12/1987
(Continued)

OTHER PUBLICATIONS

Preliminary Analysis of Remote Monitoring & Robotic Concepts for Performance Confirmation, Douglas A. McAffee, undated.*

(Continued)

*Primary Examiner*—John Kreck
(74) *Attorney, Agent, or Firm*—Pearne & Gordon LLP

(57) ABSTRACT

In monitoring a stratum disposal field for wastes, running tubes installed in the vicinity of a gallery or disposal holes, in a nearby rock bed, or within a gallery support or buffer members in the disposal holes have installed therein a movable monitoring device provided with various sensors, a water sampling device and the like. The monitoring device may be movable or fixed in a predetermined position, for measurement of the temperature, displacement, strain, stress and underground water in connection with the rock bed, the gallery support or the disposal space buffer members. Measurement of the clearances in the rock bed, the gallery support back or the disposal space buffer members is monitored. Also, sampling of underground water in the rock bed, the gallery support or the buffer members is effected, thus reducing the number of sensors, drilled holes, communication cables to facilitate the exchange or maintenance of the sensors, communication cables and the like. Further, the data measured by the monitoring device embedded in the buffer member or the like is transmitted by radio to a movable data collecting device in the running tube, or the data measured by the monitoring device is transmitted by radio to a management device disposed on the ground or somewhere else via a relay.

9 Claims, 20 Drawing Sheets

U.S. PATENT DOCUMENTS

| | | | |
|---|---|---|---|
| 4,846,604 A | | 7/1989 | Holtmann |
| 5,297,917 A | | 3/1994 | Freneix |
| 5,456,332 A | * | 10/1995 | Borenstein .................. 180/167 |
| 5,570,270 A | * | 10/1996 | Naedel et al. ............... 361/687 |
| 5,609,216 A | * | 3/1997 | Fisher et al. ............. 180/24.03 |
| 6,102,617 A | * | 8/2000 | Hampton ..................... 405/52 |
| 6,105,695 A | * | 8/2000 | Bar-Cohen et al. .......... 180/8.5 |
| 6,183,243 B1 | * | 2/2001 | Snyder ........................ 432/28 |

FOREIGN PATENT DOCUMENTS

| | | | |
|---|---|---|---|
| JP | 61-501796 A | | 8/1986 |
| JP | 62-036596 A | | 2/1987 |
| JP | 03-132589 A | | 6/1991 |
| JP | 07-306299 | * | 11/1995 |
| JP | 7-306299 A | | 11/1995 |
| JP | 9-225428 A | | 9/1997 |
| JP | 9-280000 | * | 10/1997 |
| JP | 11-506540 A | | 6/1999 |
| JP | 2000-073684 A | | 3/2000 |
| JP | 2000-283876 A | | 10/2000 |
| JP | 2000 283877 A | | 10/2000 |
| JP | 2000-283877 A | | 10/2000 |
| JP | 2000-283878 A | | 10/2000 |
| JP | 2000 345793 A | | 12/2000 |
| JP | 2001-050850 A | | 2/2001 |
| JP | 2001-323437 A | | 11/2001 |
| WO | WO96/39610 A | | 12/1996 |

OTHER PUBLICATIONS

Mined Geoligic Disposal System Advanced conceptual Design Report US Department of Energy b00000000-01717-5705-00027, Mar. 1996, p. 5.30.*

* cited by examiner

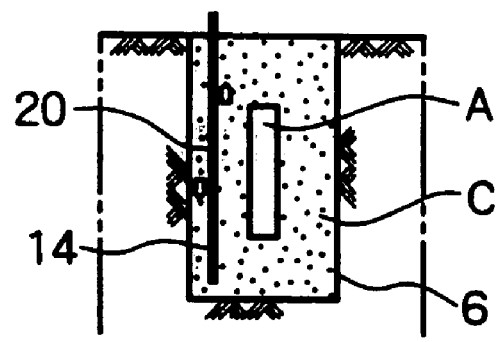
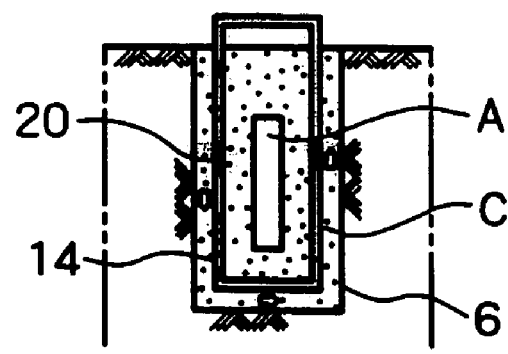
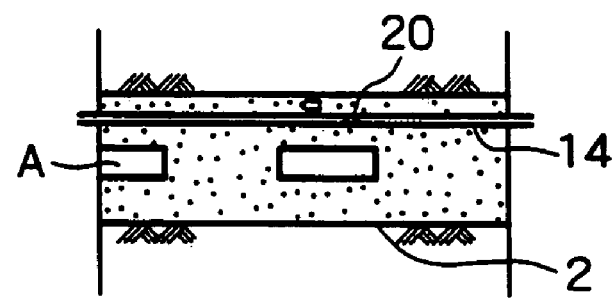
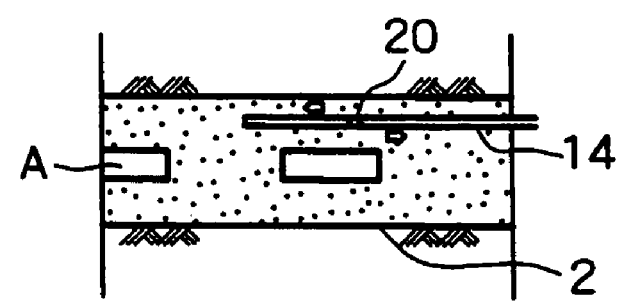
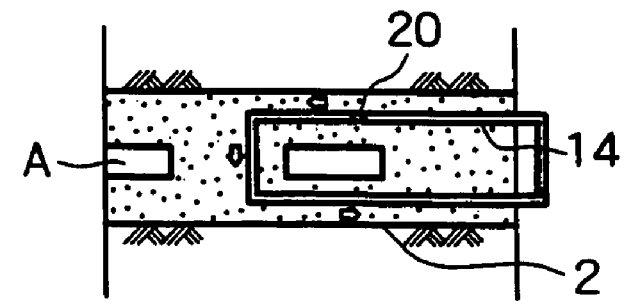

FIG. 40
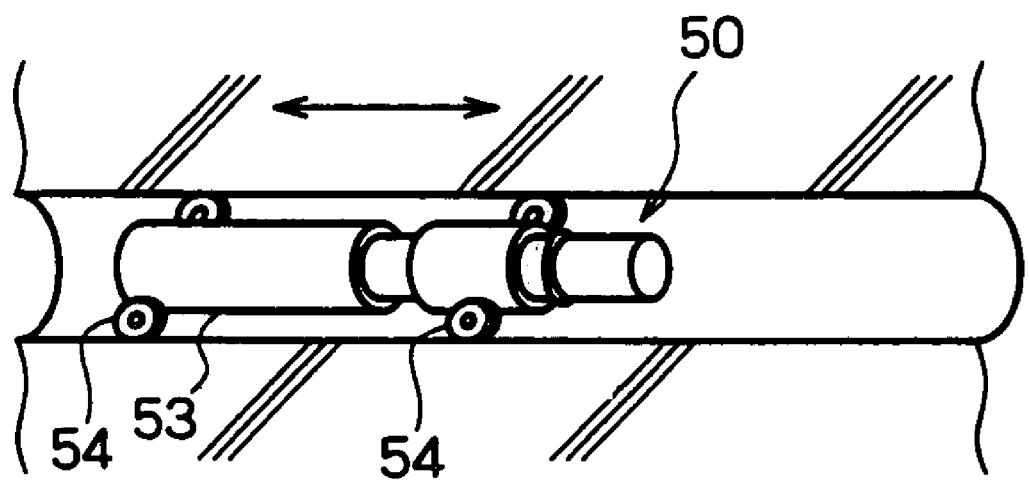
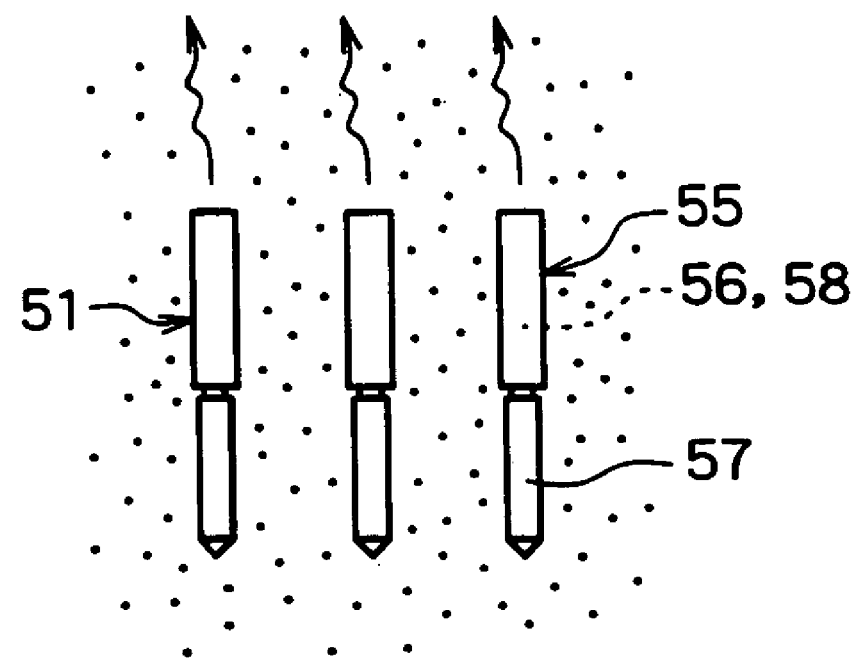

STRATUM DISPOSAL MONITORING SYSTEM

TECHNICAL FIELD

This invention relates to a gallery monitoring method, and more particularly, to monitoring as in a stratum disposal field for underground disposal of radioactive wastes and the like. The present invention also relates to a monitoring system for stratum disposal wastes and the like, and more particularly, is effectively applied to long-term monitoring and management of high-level radioactive wastes subjected to underground disposal in a deep underground part.

BACKGROUND ART

A variety of approaches to stratum disposal of radioactive wastes have been heretofore proposed. For instance, stratum disposal of high-level radioactive wastes has been projected with a system, which conducts stabilizing treatment of the wastes into vitrified wastes by melting the wastes together with a glass material at high temperatures to pour into a stainless steel canister, and stores the vitrified wastes tightly in a thick steel-plate airtight container called an over-pack to effect stratum disposal of the over-pack through a buffer member into a rock bed at a depth in the range of several hundred to several ten hundred meters from the ground.

In the above stratum disposal system, there are basically four patterns of layouts adaptable to underground stationary disposal of over-packs as shown in FIGS. 46 to 49. FIG. 46 shows the layout of a horizontal disposal-gallery pattern, in which a pair of left and right main galleries (conveyance galleries) 1, 1 have therebetween horizontally or vertically inclined disposal galleries (disposal spaces) 2. The disposal galleries 2 are obtained by boring in parallel, at given intervals, to ensure that underground stationary disposal of over-packs A is attainable sidewise within each disposal gallery 2 at given intervals in a longitudinal direction of the galleries. FIG. 47 shows the layout of a vertical disposal, vertical shaft pattern, in which an upper main gallery (conveyance gallery) 1 and a lower gallery 1' have therebetween vertical disposal holes (disposal vertical shafts: disposal spaces) 3. The disposal spaces 3 are obtained by boring in parallel at given intervals to ensure that underground stationary disposal of over-packs A is attainable lengthwise within each disposal vertical shaft 3, at given intervals, in a vertical direction of the galleries.

FIG. 48 shows the layout of a horizontal disposal, hole pattern, in which a disposal gallery (conveyance gallery) 4 has at the opposite walls thereof horizontal disposal holes (disposal spaces) 5. The disposal spaces 5 are obtained by boring at given intervals in a longitudinal direction of the gallery to ensure that underground stationary disposal of over-packs A is attainable sidewise within each disposal hole 5. FIG. 49 shows the layout of a vertical disposal-hole pattern, in which the disposal gallery 4 has at the bottom thereof vertical disposal holes (disposal spaces) 6. The disposal spaces 6 are obtained by boring at given intervals in the longitudinal direction of the gallery to ensure that underground stationary disposal of over-packs A is attainable lengthwise within each disposal hole 6.

The above stratum disposal system needs monitoring of the displacement of rock beds, the permeation of underground water and the like at the demonstration stage before operations or at the actual operational stage. In a prototype disposal field in Sweden, a demonstration has been conducted to ascertain a barrier performance, as shown in FIG. 50.

In the above demonstration, monitoring of the swelling behavior of buffer members C firstly takes place under the condition that an upper space 4 is refilled after pseudo canisters A and the buffer members C have been fixed in full-sized disposal holes 6, as shown in FIGS. 50 and 51. A large number of sensors 101 are embedded to check the behavior of the buffer members. In addition, about 30 pieces of drilled holes 103 obtained by drilling from measurement galleries 102 adjoining to each other to a prototype disposal field 100 (gallery 4 above the disposal holes) have therein communication cables to obtain data sent from the sensors.

However, the above conventional monitoring method has the disadvantages of requiring a large number of sensors, drilled holes and communication cables, and taking much time for installation works and maintenance, resulting in an increase in cost. Or, in certain circumstances, maintenance is not executable, so that the above conventional monitoring method fails to keep up with monitoring.

In addition, the monitoring equipment such as the sensors and the communication cables applied in a stratum disposal field needs to be good for a long-term service under the high-temperature/high-pressure environment. Thus, monitoring equipment having durability is required. However, as described in a later instance, the durability of the monitoring equipment is considered to be not so sufficient for the long-term service, so that the conventional monitoring method has the disadvantage of finding difficulty in exchanging once-embedded sensors and cables with new ones.

As to the durability of the sensors, a demonstration has been conducted to ascertain the performance of bentonite plugs and concrete plugs in a gallery existing at a depth of 420 meters from the ground in Canada. In this demonstration, 800 pieces or more of sensors were installed to check the performance of the bentonite plugs, with the result that an operating ratio of the sensors has dropped to the level of 80% in three years. In addition, it is reported that the computerized execution of typical civil engineering works frequently causes some failures in about 30% of the sum total of sensors until the works covering a period of several years are completed.

The present invention has been undertaken in view of the problems with the above conventional monitoring method. A first object of the present invention is to provide a gallery monitoring method, wherein in monitoring as in a stratum disposal field and the like for wastes, a reduction of the number of sensors, drilled holes and communication cables is attainable, and the exchange or maintenance of the sensors, the communication cables and the like is facilitated.

A second object of the present invention is to provide a gallery monitoring method, wherein in monitoring as in a stratum disposal field and the like for wastes, a reduction of the number of drilled holes and communication cables is attainable, an artificial barrier is prevented from having any water passage, and a monitoring device configured as a small-sized inexpensive device is available.

In the stratum disposal field as shown in FIGS. 46 to 49, upon completion of the works of underground stationary disposal of the over-packs A, not only an access gallery (such as a vertical shaft, an inclined shaft, a spiral gallery) between the ground facilities and the underground disposal field but also the main gallery, the connecting gallery and the like in the underground disposal field are refilled, resulting in the closure of the disposal field (not shown).

A basic technical concept prevailing at present in the above stratum disposal system is that care for the disposal field is not necessary after the disposal field has been closed, specifically, all the galleries and the like have been refilled. From a social point of view or a standpoint of a need to give regional residents a sense of security, it is, however, believed that there is a need to monitor the over-packs and their surroundings for a long period of time after closure of the disposal field occurs.

The above need is believed to be realizable typically with a monitoring system, which uses a sensor 200 embedded around the over-packs A within the disposal gallery 2, and further uses a communication cable (such as a wire and an optical fiber) 201, as shown in FIG. 52. This arrangement establishes connection between the sensor 200 and the ground facilities to ensure that monitoring is executable through the communication cable 201. In this case, the communication cable 201 is to be laid underground in the range of the disposal gallery 2 to the inside of the access gallery such as the vertical shaft 7. It is noted that sensor power is also fed from the ground facilities through the cable.

However, the above conventional communication cable system has the following problems.

(1) It is feared that the cable having been laid underground within the access gallery leads to the water passage, and further to the selective migration route of nuclides in future.

(2) The underground cable existing under the underground high-temperature/high-pressure environment is limited in durability, and also covers the range of a long distance, so that degradation, disconnection and the like of the cable result in long-term monitoring of difficulty.

(3) The underground sensor existing under the underground high-temperature/high-pressure environment is limited in durability, resulting in long-term monitoring of difficulty as well.

As one of the approaches to solving the problems with the above communication cable system, a monitoring device and a ground information transmitting device in a disposal field for radioactive wastes have been disclosed in Japanese Patent Laid-open No. 7-306299. Referring to FIG. 53, the patent disclosure relates to a monitoring system in a disposal field for underground stationary disposal of radioactive wastes 301 within a cavity 300 constructed in the ground. Ground information is detected with a group of sensors 302 comprised of sensors 302a1 through 302an embedded in the ground in the vicinity of the cavity 300. A measured data signal sent from each sensor 302a is transmitted as elastic waves (such as electric distorted vibrations generated by an electric distortion element sound source) EV through an antenna 304 of a transmitter/receiver 303 to ensure that the elastic waves EV having made propagation through the ground are received with a ground or underground measuring device 305. The transmitter/receiver 303 is operated with power generated by a thermo-electric conversion element 306 operated by taking advantage of heat emitted from the wastes.

However, the above monitoring system with the elastic waves has the following problems. (1) It is difficult to propagate the elastic waves from the deep underground part at a depth in the range of several hundred to several tens of hundred meters from the ground without causing attenuation. In addition, a large-sized large-capacity transmission/receiver is required for the transmitter/receiver 303 to propagate the elastic waves toward the ground facilities. (2) It is difficult to cover the power for the group 302 of sensors and the transmitter/receiver 303 only with the heat emitted from the radioactive wastes. (3) Each sensor 302a is existent in the high-temperature/high-pressure underground part, resulting in long-term monitoring of difficulty.

The present invention has been undertaken in view of the problems of the above conventional monitoring systems associated with the communication cable system and with elastic waves. Accordingly, a third object of the present invention is to provide a monitoring system for stratum disposal wastes which lessens or eliminates the conventional disadvantage of allowing the communication cable to lead to the water passage and further to the migration route for future contamination. The monitoring of the behavior of the wastes and their surroundings is executable securely over a long period of time.

DISCLOSURE OF THE INVENTION

The present invention relates to a gallery monitoring method, wherein a running path installed in the vicinity of a gallery, in a nearby rock bed or within or on a gallery support, has installed therein a movable monitoring device to ensure that monitoring of various items relating to the rock bed or the gallery support is effected.

The gallery monitoring method may be applied to maintenance and management of a typical tunnel and to those of a stratum disposal field for radioactive wastes, wherein the running path is obtained by boring the rock bed or the gallery support in parallel to or at a right angle to a gallery axis, or by installing a running tube in the bored hole. The monitoring device is mounted with one or more kinds of the equipment such as a temperature sensor, a displacement sensor (clinometer), an ultrasonic sensor, a pH sensor and a water sampling device. The monitoring device may be movable, or it may be fixed in a predetermined position, to effect measurement of the temperature, displacement, strain, stress and underground water of the rock bed or the gallery support, measurement of the clearance in the rock bed or the gallery support back, and sampling of the underground water in the rock bed or the gallery support.

The present invention further relates to a gallery monitoring method in a stratum disposal field having disposal spaces for underground disposal of the wastes through buffer members and a gallery for conveying the wastes into the disposal spaces. A running path is provided in the vicinity of a gallery, in a nearby rock bed or within or on a gallery support, or alternatively, in the vicinity of the disposal spaces, in a nearby rock bed or within or on the disposal space. A movable monitoring device is installed in the running path to ensure that monitoring of various items relating to the rock bed, the gallery support or fillers (such as buffer members and refilling members/plugs) in the disposal spaces or in the gallery is effected.

The gallery monitoring method may be applied to a stratum disposal field for radioactive wastes and the like, wherein the running path is installed in the rock bed in the vicinity of the gallery 1 or 4 in parallel to or at a right angle to a gallery axis as shown in FIGS. 46 to 49. Alternatively, the running path may be that installed within the support of the gallery 1 or 4 in parallel to the gallery axis. Alternatively, the running path may be also that installed in the rock bed in the vicinity of the disposal spaces such as the disposal galleries 2 and the disposal holes 3, 5 or 6 shown in FIGS. 46 to 49 or within the disposal space in parallel to a disposal space axis or to surround the disposal space or the over-pack. The running path is obtained by boring or by installing a running tube in the bored hole. Durable materials such as plastics and ceramics are preferably used as a running tube material.

The gallery monitoring method may employ the monitoring device mounted with one or more kinds of the equipment such as a temperature sensor, a displacement sensor (clinometer), an ultrasonic sensor, a pH sensor and a water sampling device. The monitoring device may be movable or fixed in a predetermined position, to effect measurement of the temperature, displacement, strain, stress and underground water of the bed rock, the gallery support or the buffer members, refilling members/plugs and the like in the disposal spaces or in the gallery. Measurement of the clearance in the rock bed, the gallery support back or the disposal space buffer members, refilling members/plugs and the like is also effected, and sampling of the underground water in the rock bed, the gallery support or the disposal space buffer members is also effected.

The present invention also relates to a galley monitoring method, wherein the monitoring device is the self-traveling monitoring equipment or the monitoring equipment is movable with an external drive means.

The gallery monitoring method also contemplates a monitoring device that is movable along a relatively small-diameter running path and allows the monitoring equipment with the sensor, the water sampling device or the like incorporated therein to travel by itself with a drive motor, a drive wheel and the like or to travel with an external drive such as a push rod, a cable and hydraulic pressure.

The present invention also relates to a gallery monitoring method, wherein a clinometer is used for measurement of the displacement of the rock bed, the gallery support or the disposal space buffer members.

The gallery monitoring method also contemplates arranging the monitoring device with the clinometer mounted therein to travel to ensure that measurement of the displacement of the rock bed in the vicinity of the gallery or the disposal spaces, the displacement of the gallery support or the displacement of the disposal space buffer members is effected. The strain and/or stress of the rock bed and the like may be calculated from measured data on the displacement.

The present invention also contemplates a gallery monitoring method, wherein a water sampling device is used for monitoring to effect sampling of the underground water in the rock bed, the gallery support or the disposal spaces.

The gallery monitoring method also contemplates arranging the monitoring device with the water sampling device mounted therein to travel to ensure that sampling of the underground water is effected at a predetermined position. After the sampling of the underground water, measurement of the composition of the underground water in the rock bed and the composition of water having permeated into the gallery support and the like is effected in a laboratory and the like. Direct measurement of the above components is also executable with the pH sensor.

The present invention also relates to a gallery monitoring method, wherein an ultrasonic measuring unit is used for monitoring to effect detection of the clearance in the rock bed, the gallery support or the disposal spaces.

The gallery monitoring method also contemplates arranging the monitoring device with the ultrasonic measuring unit mounted therein to travel to ensure that detection of the clearance created in the gallery support back or the like is effected. The clearance may be refilled with grout injected by using the running tube.

According to the gallery monitoring method with the running path and the movable monitoring device of the present invention having the above configuration, the running path installed in the vicinity of the gallery, in the nearby rock bed or within or on the gallery support, has installed therein the movable monitoring device to ensure that monitoring of various items relating to the rock bed, the gallery support or the like is effected. Thus, monitoring is executable over a wide range with the single monitoring device. Accordingly, a relatively small number of pieces of monitoring equipment is used to monitor a large number of items at many locations, and a substantial reduction of the number of sensors, drilled holes and communication cables is attained, as compared with the conventional monitoring method, as in a case of the prototype disposal field in Sweden.

In addition, the monitoring device may be easily taken out, so that the exchange or maintenance of the sensors, the communication cables and the like is facilitated. Thus, long-term monitoring with accuracy may be achieved.

The present invention also relates to a gallery monitoring method, wherein a running path installed in a rock bed around a gallery or within a gallery support has installed therein a movable data collecting device to ensure that various data relating to the rock bed or the gallery support is measured by a monitoring device installed at the outside of the running path. The data is then transmitted by radio to the data collecting device for collection of the measured data.

The gallery monitoring method as described immediately above may be applied to maintenance and management of a typical tunnel and to those of a stratum disposal field for radioactive wastes, wherein the running path is obtained by boring the rock bed or the gallery support in parallel to or at a right angle to a gallery axis or by installing a running tube in the bored hole. The monitoring device (such as an underground radio sensor) is installed in the rock bed in the vicinity of the running path, within the gallery or the like to ensure that measurement of the temperature, displacement, strain, stress, pore water pressure, clearance, gas, potential, underground water chemical data (such as pH, Eh, underground water composition, radioactivity, electric conductivity) and the like of the nearby rock bed, the gallery support or the like is effected, for instance. The measured data is transmitted from a transmitter mounted in the monitoring device with a radio system (such as of electromagnetic, acoustic or ultrasonic wave type) to a receiver of the data collecting device being moved within the running path or fixed at a predetermined position to effect collection of the measured data.

The present invention also relates to a gallery monitoring method in a stratum disposal field having disposal spaces applied to underground disposal of the wastes through buffer members and a gallery for conveying the wastes to the disposal spaces, wherein a running path installed in a rock bed around a gallery or within a gallery support, or alternatively in the rock bed around the disposal spaces has installed therein a movable data collecting device. This arrangement ensures that various data relating to the rock bed, the gallery support or fillers (such as buffer members and refilling members/plugs) in the disposal spaces or in the gallery is measured by a monitoring device installed at the outside of the running path and is then transmitted by radio to the data collecting device for collection of the measured data.

The gallery monitoring method as described immediately above is that applied to a stratum disposal field for radioactive wastes and the like, wherein the running path is installed in the rock bed in the vicinity of the gallery 1 or 4 shown in FIGS. 46 to 49 in parallel to or at a right angle to a gallery axis. Alternatively, the running path may be that installed within the support of the gallery 1 or 4 in parallel to the gallery axis. Alternatively, the running path may be also that installed in the rock bed in the vicinity of the disposal spaces such as the disposal galleries 2 and the disposal holes 3, 5 or 6 shown in FIGS. 46 to 49 in parallel to a disposal space axis. The running path is obtained by boring or by installing a running tube in the bored hole. Durable materials such as plastics and ceramics are preferably used as a running tube material.

On one hand, the monitoring device (such as the underground radio sensor) is embedded in contact with or close to the over-packs subjected to underground stationary disposal within the disposal spaces, or alternatively, embedded within the refilling members and the like of the gallery and the like communicating with the disposal holes. This mounting ensures that measurement of the temperature and the like of the over-packs is effected, measurement of the temperature, swelling pressure, strain and the like of the buffer members or the refilling members is also effected, and measurement of the temperature, displacement, strain, stress, pore water pressure, clearance, gas, potential, underground water chemical data (such as pH, Eh, underground water composition, radioactivity, electric conductivity) and the like of the nearby rock bed, the gallery support or the like is also effected. The measured data is transmitted from a transmitter mounted in the monitoring device with a radio system (such as of electromagnetic, acoustic or ultrasonic wave type) to the data collecting device being moved within the running path or fixed at a predetermined position to effect collection of the measured data.

In the above-described gallery monitoring methods, the data collecting device may be configured so that the self-traveling data collecting equipment or the data collecting equipment movable with an external drive has a data receiver.

In the foregoing method, the data collecting equipment has at least the receiver and may be arranged to transmit received measured data through a communication cable or to store the received measured data temporarily in a memory of the data collecting equipment. Also, the data collecting equipment may have a sensor to ensure that measurement separately from that with the monitoring device (such as the underground radio sensor) is effected.

In accordance with the method, the monitoring device may be configured so that a power supply, a sensor for effecting measurement of various data and a transmitter for transmitting, by radio, the measured data sent from the sensor are housed in an airtight container.

The monitoring device and the data collecting equipment may be located relatively close to each other, so that a small-sized transmitter or the like is available. The sensor may be operated at all times, or at regular intervals for power saving. Alternatively, the monitoring device and the data collecting equipment may respectively have a transmission/receiver to control the sensor and the like in response to a control signal sent to the monitoring device.

According to the gallery monitoring method with the running path, the movable data collecting device and the underground radio sensor of the present invention having the above configuration, the running path installed in the rock bed around the gallery, within the gallery support or the like has installed therein the movable data collecting device. This arrangement ensures that various data relating to the rock bed, the gallery support or the fillers in the disposal spaces or in the gallery is measured by the monitoring device and is then transmitted by radio to the data collecting device for collection of the measured data. Thus, a substantial reduction of the number of drilled holes and communication cables is attainable, as compared with the conventional monitoring method as in a case of the prototype disposal field in Sweden.

In addition, transmission of the data measured by the monitoring device to the data collecting device by radio ensures that the artificial barrier such as the buffer members and the refilling members is prevented from having any water passage (such as the communication cable and the running tube), and that the presence of any selective migration route of the nuclides is eliminated, resulting in no damage to security of the disposal field. Further, the monitoring device is located relatively close to the data collecting device in the running path, so that communication by radio is limited to short-distance communication covering the range of a distance as short as about ten meters, for instance, and would be thus satisfied with a small-sized communication device that contributes to size and cost reductions of the monitoring device.

In accordance with the invention, the data measured by a monitoring device installed within the disposal space may be transmitted as a data signal to a ground or underground management device via an underground relay. For example, the data measured by the monitoring device may be transmitted as a data signal to the management device disposed on the ground or somewhere else via the relay to ensure that monitoring is executed in the management device. The data signal may comprise electromagnetic waves (such as magnetic signals), sound waves or ultrasonic waves.

In accordance with the invention, the monitoring device may be configured so that a power supply, a sensor for effecting measurement of various data and a transmitter/receiver for transmitting, by radio, the measured data sent from the sensor and receiving, by radio, a control signal sent from the management device are housed in an airtight container. Further, the relay may be configured so that a power supply and a transmitter/receiver for relaying, by radio, signals sent from the monitoring device and the management device are housed in an airtight container.

The airtight container may be a container in the form of a thick spherical shell or the like made of a material excellent in corrosion resistance, pressure resistance, radioactive resistance and the like. In addition, long-life batteries sufficient for monitoring the required number of years are mounted in the power supply to ensure that the power supply is serviceable over a long period of time such as one hundred years or more, for instance. The transmitter/receiver of the monitoring device is to effect transmission of the measured data to the relay with the radio system of electromagnetic, acoustic or ultrasonic wave type and reception of the control signal sent from the management device disposed on the ground or somewhere else via the relay. The transmitter/receiver of the relay is to effect relaying of the data signal to another relay and/or the management device disposed on the ground or somewhere else, and relaying of the control signal sent from the management device disposed on the ground or somewhere else to another relay and/or the monitoring device.

In accordance with a further aspect of the invention, the airtight container is charged with inert gas. Specifically, the airtight container is charged with nitrogen gas or the like to suppress the degradation of the internal equipment to ensure that the monitoring device and the relay will be serviceable over a long period of time.

The monitoring system may be applied to the underground stationary disposal of the over-packs at given intervals in a longitudinal direction, or a plurality of disposal holes provided along the gallery and applied to underground stationary disposal of the over-packs. For example, the monitoring system may be applied to the maintenance and management of a stratum disposal field for high-level radioactive over-packs subjected to underground stationary disposal within the disposal gallery or the disposal holes in the deep underground part.

The monitoring device may be installed in the vicinity of the over-packs to ensure that measurement of items relating to the over-packs, the rock bed, the artificial barrier, to the gallery support or the like is effected. Monitoring items include the temperature and the like of the over-packs, the temperature, swelling pressure, strain and the like of the buffer members, the temperature, displacement, strain, stress, pore water pressure, clearance, gas, potential, underground water chemical data (such as pH, Eh, underground water composition, radioactivity, electric conductivity) and the like of the nearby rock bed, the gallery support or the like.

The relay may be installed within a vertical shaft. Specifically, the relay may be installed within the vertical shaft communicating with the disposal space. In a case of the high-level radioactive over-packs, the relay needs to be installed within the access gallery (such as the vertical shaft and the inclined shaft) communicating with the underground disposal field, and within the main gallery, the connecting gallery and the like in the underground disposal field. Upon completion of the works of underground stationary disposal of the over-packs, the vertical shaft and the like are refilled with the refilling members (such as soil), with the result that the electromagnetic waves or the like propagate through the refilling members, while attenuation of the electromagnetic waves or the like occurs in the refilling members. Thus, to prevent the above attenuation, the relay also needs to be installed at intervals of a distance at which transmission of data and the like is executable without fail. It is noted that monitoring with the monitoring system according to the present invention is also executable before refilling of the vertical shaft and the like is effected.

According to the monitoring system for stratum disposal wastes with the data radio transmission system of the present invention having the above configuration, the measured data from the monitoring device is transmitted to the management device on the ground or somewhere else via the relay with a radio system of electromagnetic or sound wave type or the like to ensure that monitoring is executed in the management device. Thus, there is no fear that the communication cable leads to water passage and further to the selective migration route of the nuclides and the like, unlike the conventional communication cable system.

In addition, transmission of the data via the relay with the radio system of electromagnetic or sound wave type or the like ensures that the measured data is securely transmitted even through the underground part after closure of the disposal field. Further, the monitoring device and the relay are of a structure that is good for a long-term service and withstands corrosion, degradation and the like over a long period of time under the underground high-temperature/high-pressure environment, with the result that long-term monitoring of the behavior of the wastes and their surroundings is executable securely.

BRIEF DESCRIPTION OF THE DRAWINGS

FIG. 6 is a cross-sectional view showing monitoring (of reciprocating type) of the artificial barrier in a disposal hole in the gallery monitoring method with the running path and the movable monitoring device according to the present invention;

FIG. 7 is a cross-sectional view showing monitoring (of circulation type) of the artificial barrier in the disposal hole in the gallery monitoring method with the running path and the movable monitoring device according to the present invention;

FIG. 8 is a cross-sectional view showing monitoring (of one way type) of the artificial barrier in a disposal gallery in the gallery monitoring method with the running path and the movable monitoring device according to the present invention;

FIG. 9 is a cross-sectional view showing monitoring (of reciprocating type) of the artificial barrier in the disposal gallery in the gallery monitoring method with the running path and the movable monitoring device according to the present invention;

FIG. 10 is a cross-sectional view showing monitoring (of circulation type) of the artificial barrier in the disposal gallery in the gallery monitoring method with the running path and the movable monitoring device according to the present invention;

FIG. 40 is a cross-sectional view showing the movable data collecting device in monitoring shown in FIG. 39 and a monitoring device configured by an underground radio sensor;

BEST MODE FOR CARRYING OUT THE INVENTION

The present invention will now be described with reference to illustrated embodiments. The illustrated embodiments are applications of the present invention to a stratum disposal field for high-level radioactive wastes. FIGS. 1 to 38 respectively show an embodiment of a gallery monitoring method with a running path and a movable monitoring device of the present invention.

Figure 1:
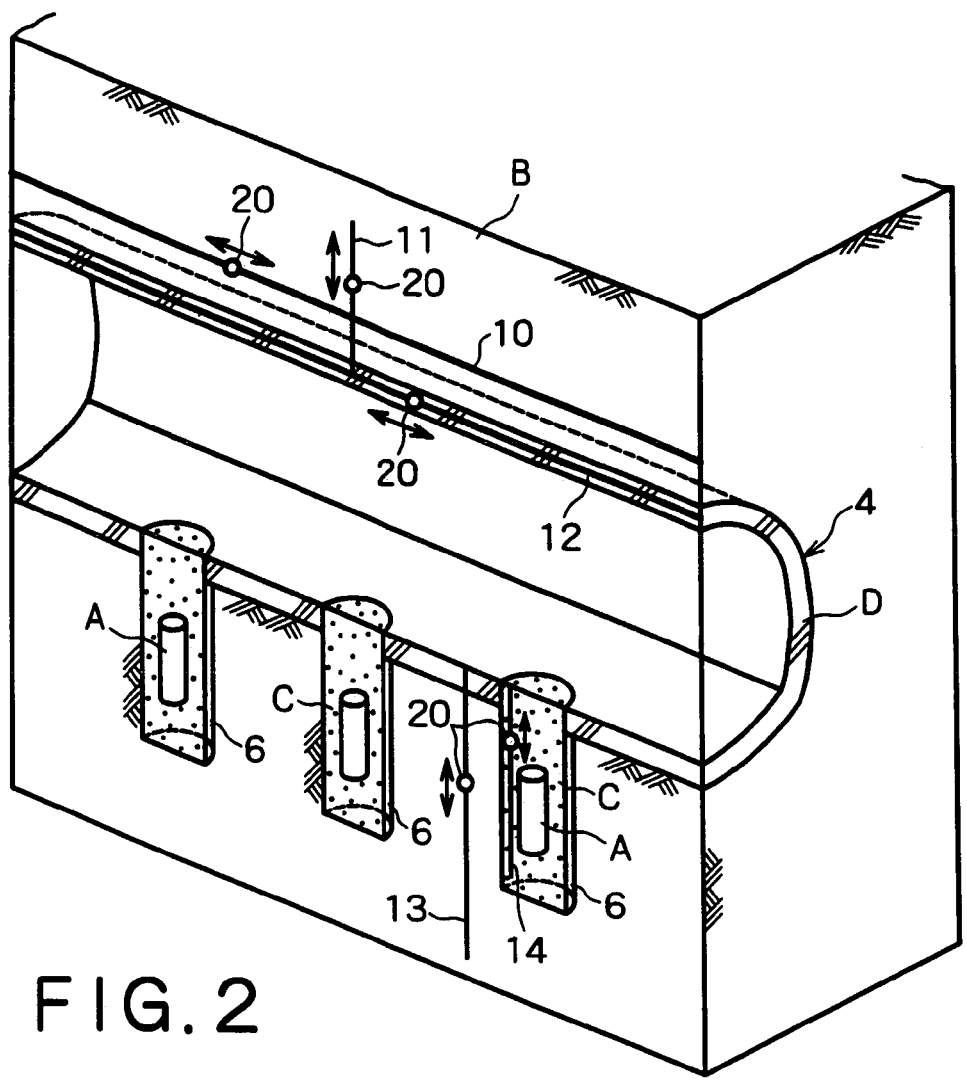
FIG. 1 is a perspective view in cross-section showing an embodiment of a gallery monitoring method with a running path and a movable monitoring device of the present invention applied to stratum disposal of wastes.
Figure 2:
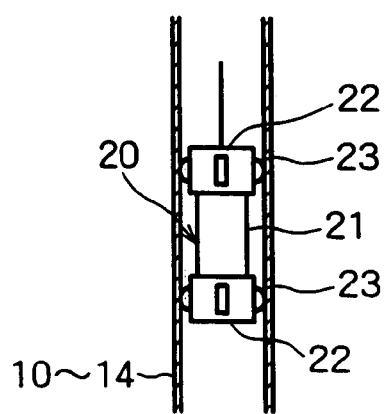
FIG. 2 is a partial cross-sectional view of FIG. 1.

In FIGS. 1 and 2, there is shown an application of the above gallery monitoring method to the layout of the vertical disposal-hole pattern as shown in FIGS. 46 to 49. A running tube 10, parallel to an axial direction of a disposal gallery 4, is installed in a rock bed B in the vicinity of the gallery 4. A running tube 11 is also installed in the rock bed B in the vicinity of the gallery 4 at a right angle to the axial direction of the gallery 4. In addition, a running tube 12, parallel to the axial direction of the disposal gallery 4, is installed within or on a support (such as sprayed concrete and secondary lined concrete) D of the gallery 4.

Further, a running tube 13, parallel to the axial direction of a vertically bored disposal hole 6, is installed in the rock bed B in the vicinity of the disposal hole 6 at the bottom of the gallery 4. Also, a running tube 14, parallel to the axial direction of the disposal hole 6, is installed at the outside of an over-pack A within a buffer member (such as blended soil mainly contained bentonite) C in the disposal hole 6. It is noted that the bentonite-contained blended soil of the buffer member C is a material that shows dynamic buffering functions, low permeability and low diffusibility of radioactive material and has the advantage of reducing effects of rock bed pressure and/or underground water to retard the migration of nuclides.

The above running tubes 10 to 14 have installed therein a movable monitoring device 20. With the monitoring device 20 being moved or fixed in a predetermined position, monitoring such as measurement of various data and sampling of water as described later is effected. In addition, with the monitoring device 20 taken out from the running tubes, the exchange or maintenance of sensors, communication cables and the like is also effected at need.

As shown in FIG. 2, the monitoring device 20 comprises a body 21 with the monitoring equipment such as the sensor incorporated therein, a travel stabilizer 22 installed at the opposite ends of the body 21 and the like, for instance. Each travel stabilizer 22 has a plurality of wheels, rollers, sliders 23 or the like spaced at intervals in a circumference direction of the stabilizer. The number of sensors or the like mounted in the body 21 is by no means limited to one, and alternatively, it is also allowable to mount a plurality of sensors or the like therein.

Figure 3:
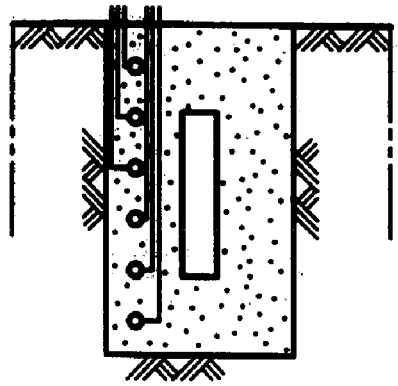
FIG. 3 is a cross-sectional view showing conventional monitoring of an artificial barrier.
Figure 4:
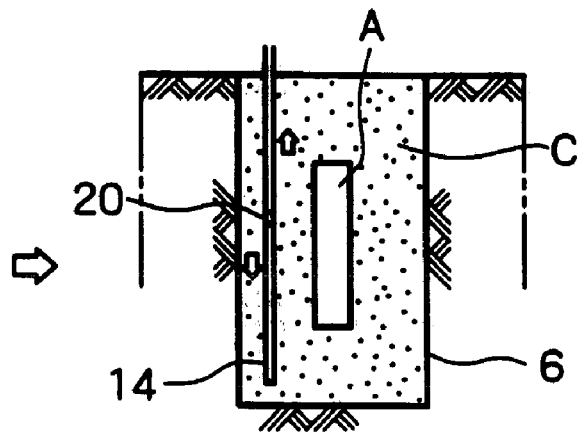
FIG. 4 is a cross-sectional view showing monitoring of an artificial barrier according to the present invention.

FIG. 4 is a schematic view of monitoring of an artificial barrier (such as the buffering member) within the disposal hole. The running tube 14 is installed within the buffer member C in the disposal hole 6 to ensure that various data is obtainable at arbitrary positions within the running tube 14 by vertically moving the various monitoring devices 20 respectively having various sensors or the like along the inside of the running tube 14. Thus, a substantial reduction of the number of sensors is attainable as compared with the conventional monitoring as shown in FIG. 3, thereby permitting a cost reduction.

Figure 5:
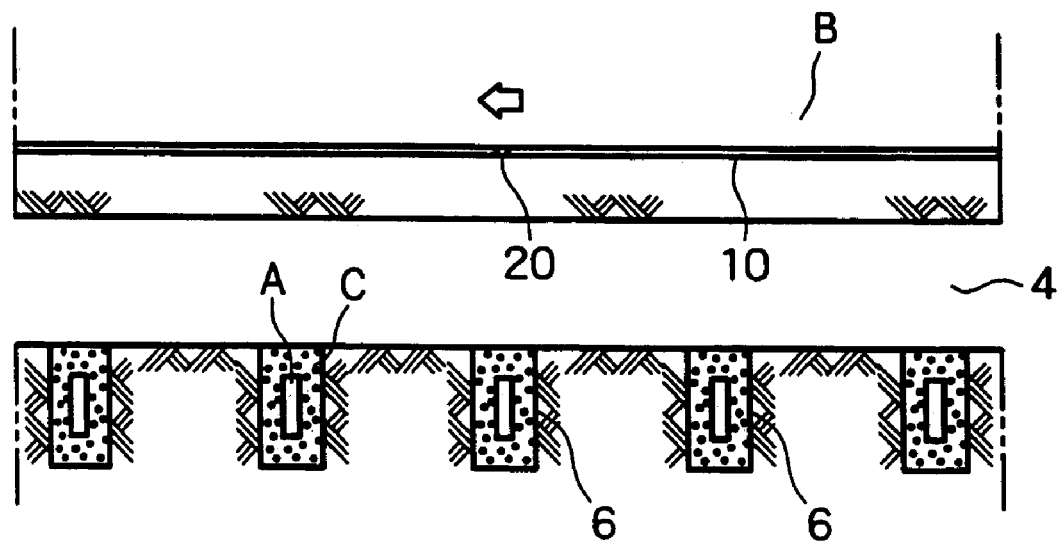
FIG. 5 is a cross-sectional view showing monitoring of a natural barrier according to the present invention.

FIG. 5 is a schematic view of monitoring of a natural barrier (such as the rock bed), wherein the running tube 10 is installed within a bored hole obtained by horizontally boring along parent rock around the disposal gallery 4. This ensures that monitoring is executable over a wide range with a single sensor by horizontally moving the monitoring device 20 along the inside of the running tube 10. Monitoring of a large number of items is also executable by changing the kind of sensor or the like.

It is noted that the manner of moving the monitoring device 20, only at the time of exchange, is sufficient for handling of the monitoring device 20 in a case where there is no need to move the monitoring device 20 at all times.

(1) Layout of the Running Tube

FIGS. 6 to 10 show embodiments of a running tube layout when the running tube is installed within the artificial barrier in the vicinity of the over-pack, respectively. In the vertical disposal-hole pattern, the running tube layout such as of reciprocating type, which is adaptable to vertical reciprocation of the monitoring device 20 within a linear running tube 14 as shown in FIG. 6. A circulating type running tube layout, which is adaptable to circulation of the monitoring device 20 within an annular running tube 14 installed around the over-pack A, is shown in FIG. 7.

In the horizontal disposal-gallery pattern, the running tube layout which is adaptable to horizontal movement of the monitoring device 20 in one direction within a running tube 14 installed in parallel to the axial direction of the disposal gallery 4 is shown in FIG. 8. A reciprocating type, which is adaptable to horizontal reciprocation of the monitoring device 20 within a relatively short running tube 14 is shown in FIG. 9. A circulation type, which is adaptable to circulation of the monitoring device 20 around one or more over-packs A, is as shown in FIG. 10.

Figure 11:
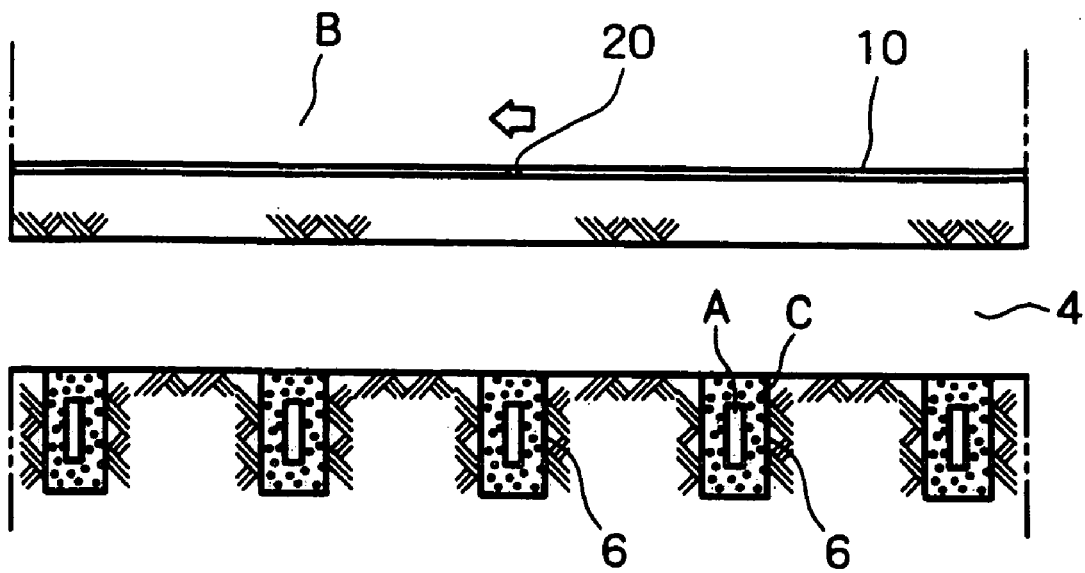
FIG. 11 is a cross-sectional view showing monitoring of the natural barrier in a gallery in the gallery monitoring method with the running path and the movable monitoring device according to the present invention.
Figure 12:
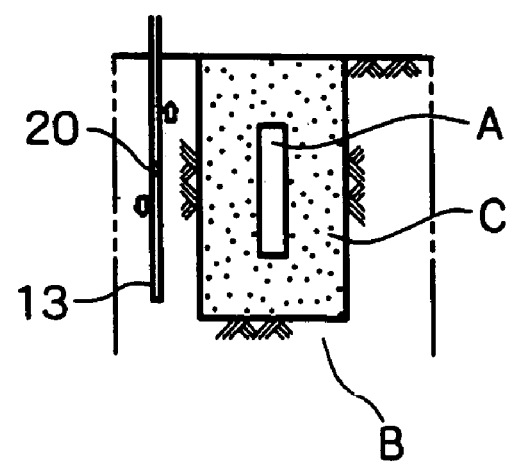
FIG. 12 is a cross-sectional view showing monitoring of the natural barrier in a disposal hole in the gallery monitoring method with the running path and the movable monitoring device according to the present invention.

FIGS. 11 and 12 show embodiments of a running tube layout of a natural barrier, respectively. The running tube layout, such as of one way type, is applied to the disposal gallery 4 of the vertical disposal-hole pattern of FIG. 11. The running tube layout, such as of reciprocating type, is applied to the disposal hole 6 of the vertical disposal-hole pattern of FIG. 12.

(2) Moving System of the Monitoring Device

Figure 13:
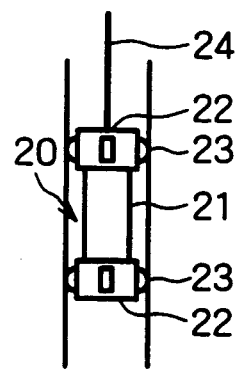
FIG. 13 is a cross-sectional view showing a moving system (of self-traveling type) of a monitoring device in the gallery monitoring method with the running path and the movable monitoring device according to the present invention.

FIGS. 13 to 16 show embodiments of a moving system of the monitoring device 20, respectively. FIG. 13 shows an embodiment of a moving system of self-traveling type, which is to allow the monitoring device to travel by itself with a plurality of drive wheels 23 mounted to the travel stabilizer 22 so as to be rolling along an inner surface of the running path. A power cable 24 is used to feed power to a drive motor of the drive wheels 23. It is noted that feeding by the power cable is not restrictive, and alternatively, it is also possible to employ a battery power supply.

Figure 14:
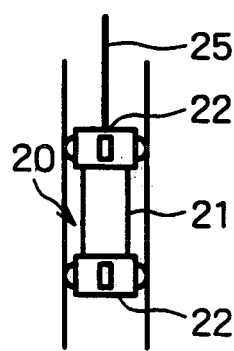
FIG. 14 is a cross-sectional view showing a moving system (of single-action pressing type) of the monitoring device in the gallery monitoring method with the running path and the movable monitoring device according to the present invention.

FIG. 14 shows an embodiment of a moving system of single action pressing type, which is to push or pull the monitoring device 20 from one side thereof with a forcing-in device 25, such as an expansible rod. The moving system adapted to vertical movement of the monitoring device, as in the case of the layout of the vertical disposal-hole pattern, takes advantage of gravity, and therefore, may be of hoisting up/down type with a cable, a winch and the like.

Figure 15:
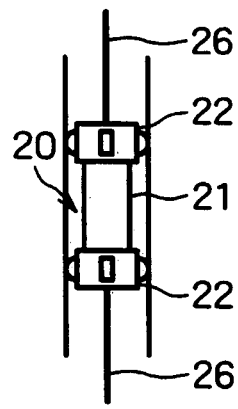
FIG. 15 is a cross-sectional view showing a moving system (of cable type) of the monitoring device in the gallery monitoring method with the running path and the movable monitoring device according to the present invention.

FIG. 15 shows an embodiment of a moving system of cable type that includes traction of the monitoring device 20 with a traction cable 26 connected to the opposite ends of the monitoring device 20. The traction cable 26 connected to only an upper end of the monitoring device 20 suffices for the moving system adapted to vertical movement of the monitoring device in the case of a layout of the vertical disposal-hole pattern.

Figure 16:
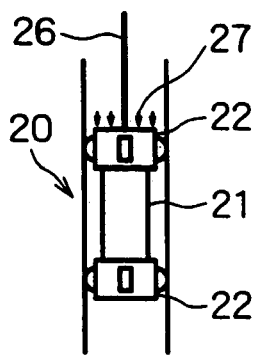
FIG. 16 is a cross-sectional view showing a moving system (of pressure type) of the monitoring device in the gallery monitoring method with the running path and the movable monitoring device according to the present invention.

FIG. 16 shows an embodiment of a moving system of pressure type wherein the monitoring device 20 is moved with a pneumatic or hydraulic pressure (when the running tube is filled with liquid) 27. A moving system may include the use of pneumatic pressure or the like for movement in one direction and the traction cable 26 for movement in the other direction. It is also possible to use pneumatic pressure or the like for movement in both the directions.

(3) Configuration of the Monitoring Device

Figure 17:
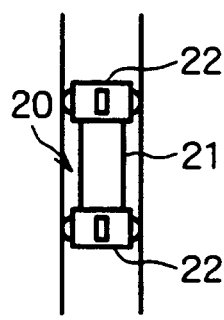
FIG. 17 is a cross-sectional view showing a configuration (of basic type) of the monitoring device in the gallery monitoring method with the running path and the movable monitoring device according to the present invention.

FIGS. 17 to 20 show embodiments of various configurations of the monitoring device 20. FIG. 17 shows an embodiment of a configuration of basic type wherein the device 20 has a wheeled travel stabilizer 22 at the opposite ends of a cylindrical body 21. The monitoring device in this case ensures satisfactory traveling performance in a case of traveling along the inside of the linear running tube.

Figure 18:
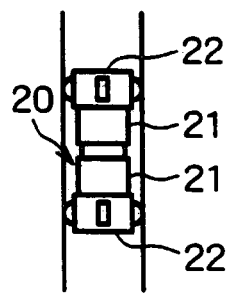
FIG. 18 is a cross-sectional view showing a configuration (of middle bent type) of the monitoring device in the gallery monitoring method with the running path and the movable monitoring device according to the present invention.

FIG. 18 shows an embodiment of a configuration of middle bent type wherein the device 20 includes a body 21, having a center part that is halved so that two center parts are connected together through a pin hinge or the like in a bendable or pivotable manner. The monitoring device in this case ensures smooth traveling in a case of traveling along the inside of a curved running tube. The location of the bent portion is by no means limited to the body 21, and alternatively, a portion other than the body may have the bent portion.

Figure 19:
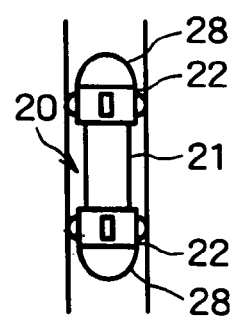
FIG. 19 is a cross-sectional view showing a configuration (of streamlined type) of the monitoring device in the gallery monitoring method with the running path and the movable monitoring device according to the present invention.

FIG. 19 shows an embodiment of a configuration wherein the device 20 has a streamlined end 28 at the opposite ends thereof. The monitoring device in this case is effectively applied to the traveling thereof within liquid.

Figure 20:
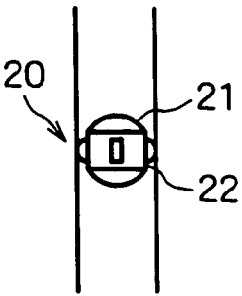
FIG. 20 is a cross-sectional view showing a configuration (of spherical type) of the monitoring device in the gallery monitoring method with the running path and the movable monitoring device according to the present invention.

FIG. 20 shows an embodiment of a configuration wherein the device 20 has the shape of a sphere as a whole, and a spherical body 21 has in the center thereof the travel stabilizer 22. The monitoring device in this case results in a compact configuration, and therefore, ensures satisfactory traveling performance.

Figure 21:
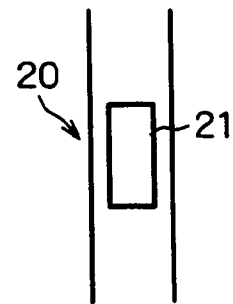
FIG. 21 is a cross-sectional view showing a configuration (of cylindrical type) of the monitoring device in the gallery monitoring method with the running path and the movable monitoring device according to the present invention.

FIG. 21 shows an embodiment of a configuration wherein the device 20 has a cylindrical body 21. This monitoring device is believed to travel sufficiently without a travel stabilizer 22 along the inside of the linear running tube.

Figure 22:
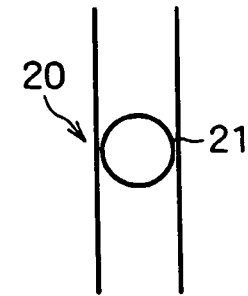
FIG. 22 is a cross-sectional view showing a configuration (of spherical type) of the monitoring device in the gallery monitoring method with the running path and the movable monitoring device according to the present invention.
Figure 23:
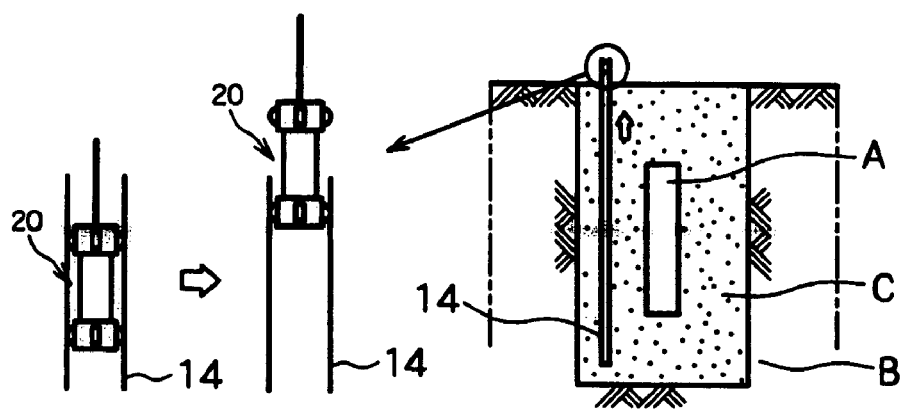
FIG. 23 is a cross-sectional view showing how to exchange the monitoring device (one embodiment) in the gallery monitoring method with the running path and the movable monitoring device according to the present invention.

FIG. 22 shows an embodiment of a configuration wherein the device 20 has only a spherical body 21. As long as the monitoring device employs the moving system of pressure type (such as pneumatic or hydraulic pressure) and also has a data storage device incorporated therein, no cable is required. This provides a simplified system.

(4) How to Exchange the Monitoring Device

The simplest approach to meet demands for increased "easy exchangeability" and "facilitated maintenance" that are features of the movable monitoring device is to completely exchange the monitoring device by inserting a new monitoring device after directly taking out the used monitoring device 20 from the end of the running tube 14.

Figure 24:
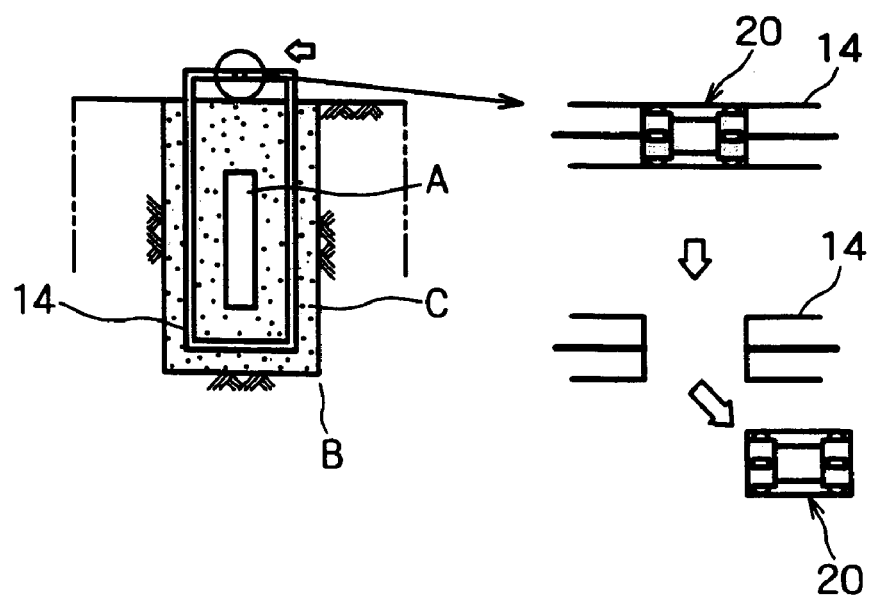
FIG. 24 is a cross-sectional view showing how to exchange the monitoring device (another embodiment) in the gallery monitoring method with the running path and the movable monitoring device according to the present invention.

By contrast, when the temporary storage of the monitoring device 20 in a different place is desired because there is no need for monitoring at all times, or no destruction or contamination of the atmosphere in the running tube is desired, a method of detachably mounting the monitoring device 20 configured to be integral with a part of the running tube 14 may be done as shown in FIG. 24. This method is effective in maintaining the atmosphere in the running tube 14 constant, and therefore, has little effect on the artificial barrier. A calibration of the sensor itself is also facilitated.

(5) How to Transmit Data from the Monitoring Device

Figure 25:
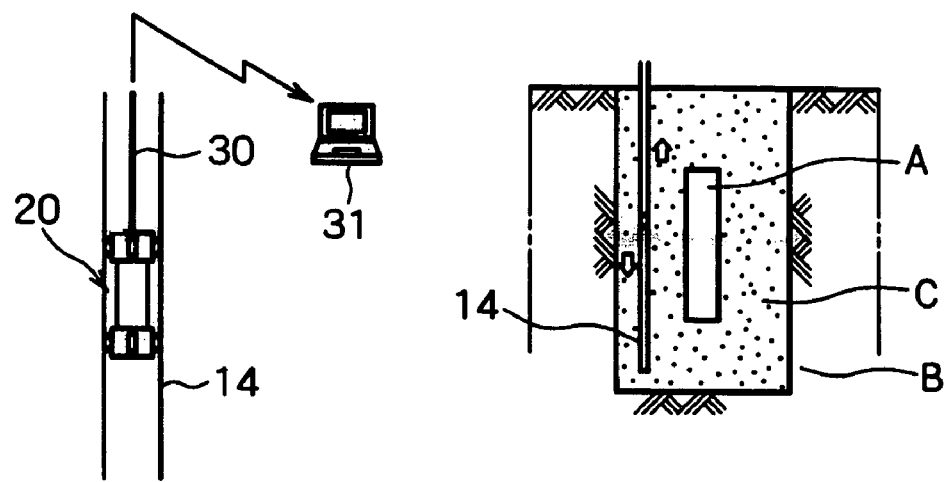
FIG. 25 is a cross-sectional view showing how to transmit data from the monitoring device (one embodiment) in the gallery monitoring method with the running path and the movable monitoring device according to the present invention.

A method of directly transmitting data measured with the sensor of the monitoring device 20 to a recording device 31 such as a personal computer, through a communicating cable 30 that is also used as the cable for the moving system as shown in FIG. 25. This method ensures high reliability, whereas the burden on the cable is increased with the increasing transmission distance.

Figure 26:
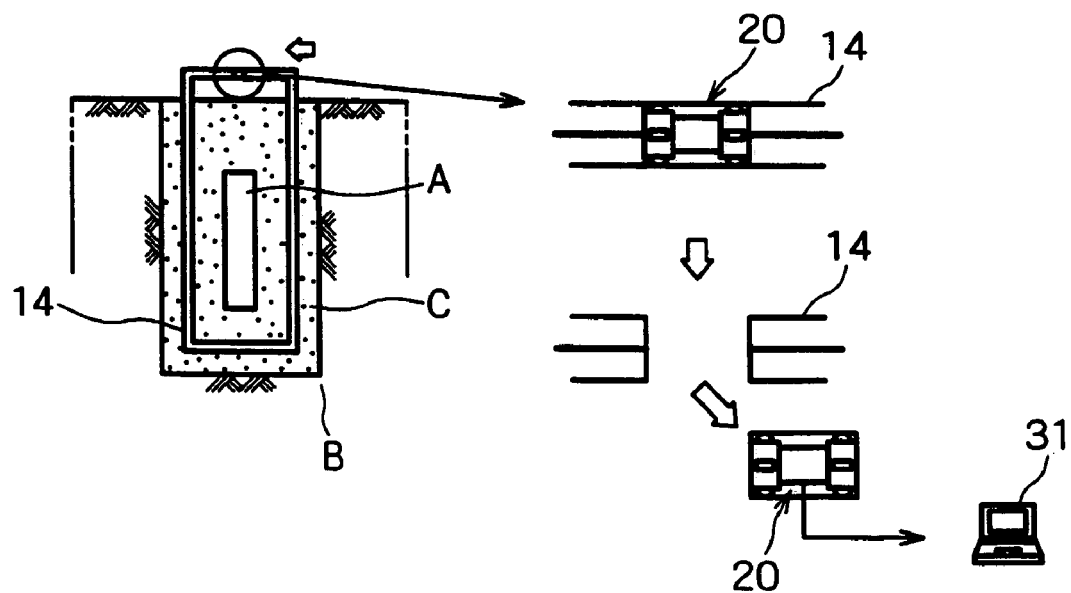
FIG. 26 is a cross-sectional view showing how to transmit data from the monitoring device (another embodiment) in the gallery monitoring method with the running path and the movable monitoring device according to the present invention.

Alternatively, a method of temporarily storing data obtained by monitoring in a memory incorporated in the sensor is also possible. Specifically, after being moved to a predetermined position within the running tube 14, the monitoring device 20 with the data therein is connected to the recording device 31 to transfer the data thereto for storage, as shown in FIG. 26. As the occasion demands, the monitoring device 20 is connected to the recording device 31 after removal from the running tube 14. When the monitoring device 20 employs the moving system of pressure type, no cable is required, thereby providing a simplified system.

It is noted that transmission of data is by no means limited to the above data transmission methods, and alternatively, it is also allowable to transmit data by radio.

Further, traveling of the monitoring device 20 is controlled manually by an operator or automatically by a computer with a wired or radio system.

(6) How to Refill the Running Tube

Continuous monitoring takes place during the conveyance and stationary disposal of the over-packs A, the buffer members C and the like in the actual operational stage. Upon completion of these operations, the conveyance galleries and the like are refilled for permanent closure thereof. In this case, refilling in an appropriate manner is required for preventing the running tube installed in the natural or artificial barrier from leading to or resulting in the subsequent passage of water. An embodiment of an appropriate refilling is shown in FIG. 27.

Figure 27:
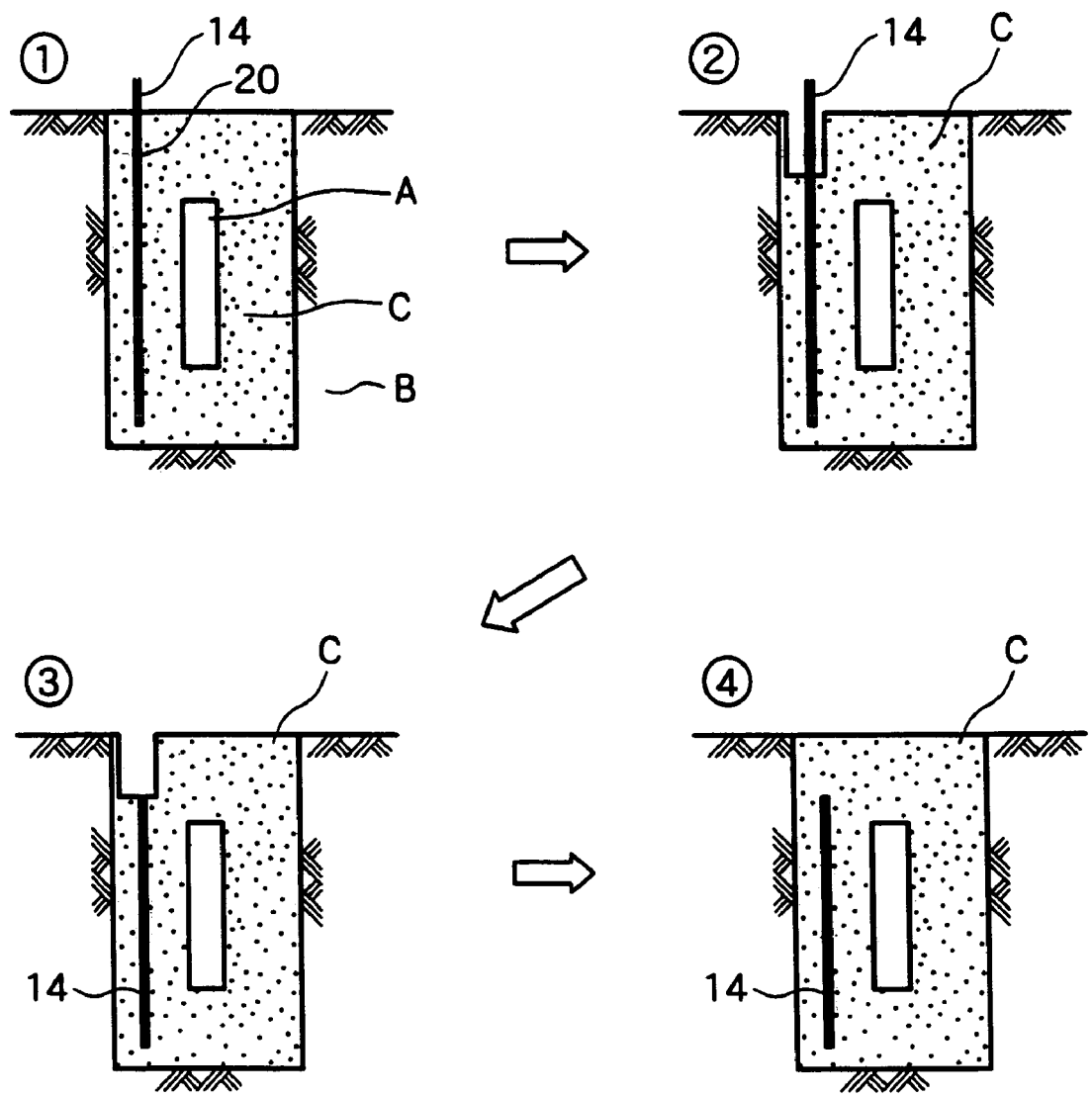
FIG. 27 is a cross-sectional view showing a process of refilling a running tube in sequence in the gallery monitoring method with the running path and the movable monitoring device according to the present invention.

Referring to FIG. 27, injection of bentonite C into the running tube 14 firstly takes place after removal of the monitoring device 20 from the running tube 14. The buffer member C around an upper part of the running tube 14 is then bored for a predetermined distance from an upper face of the buffer member C. Next, an upper part of the running tube is cut off. Lastly, a space resulting from boring is refilled with the buffer member C.

(7) Running Tubes

When the movable monitoring device 20 is in use, the device itself is exchangeable, so that long-term monitoring becomes executable while repeating the exchange of the monitoring device. However, it is difficult to exchange the running tubes 10 to 14, so that durable materials such as plastics and ceramics, for instance, are preferably used as a running tube material.

(8) Others

Figure 28:
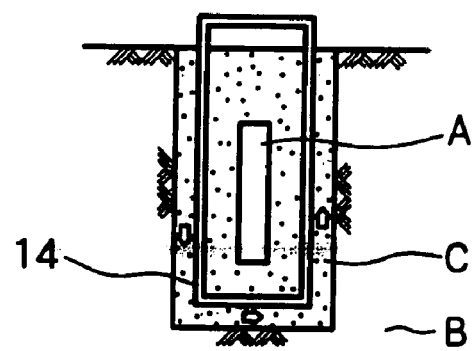
FIG. 28 is a cross-sectional view showing different monitoring (one modification) in the gallery monitoring method with the running path and the movable monitoring device according to the present invention.

As shown in FIG. 28, charging of inert gas such as nitrogen gas in the running tube 14 is proposed in order to reduce the effect on the artificial barrier, such as the buffer member C.

Figure 29:
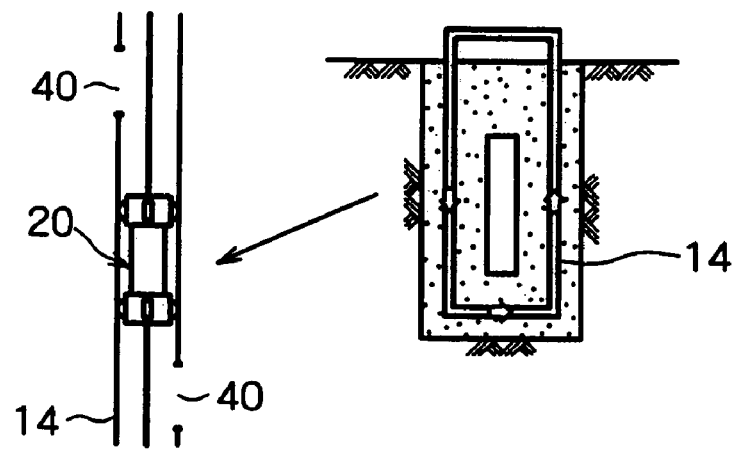
FIG. 29 is a cross-sectional view showing different monitoring (another modification) in the gallery monitoring method with the running path and the movable monitoring device according to the present invention.

In addition, as shown in FIG. 29, monitoring of the chemical characteristics such as pH of buffer member pore water may be done by employing a structure, in which water passage holes 40 are opened in the running tube 14 to allow pore water to permeate into the running tube 14 after re-flooding.

Figure 30:
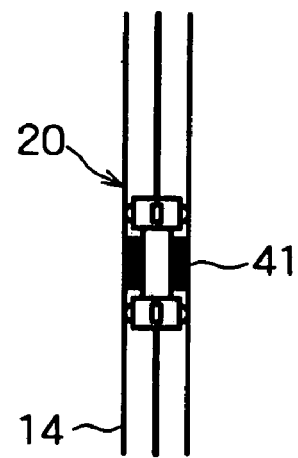
FIG. 30 is a cross-sectional view showing maintenance in the gallery monitoring method with the running path and the movable monitoring device according to the present invention.

Further, as shown in FIG. 30, maintenance of the running tube 14 is also executable by mounting a cleaning brush 41 on the monitoring device 20.

(9) Specific Embodiments of Measurement

Figure 31:
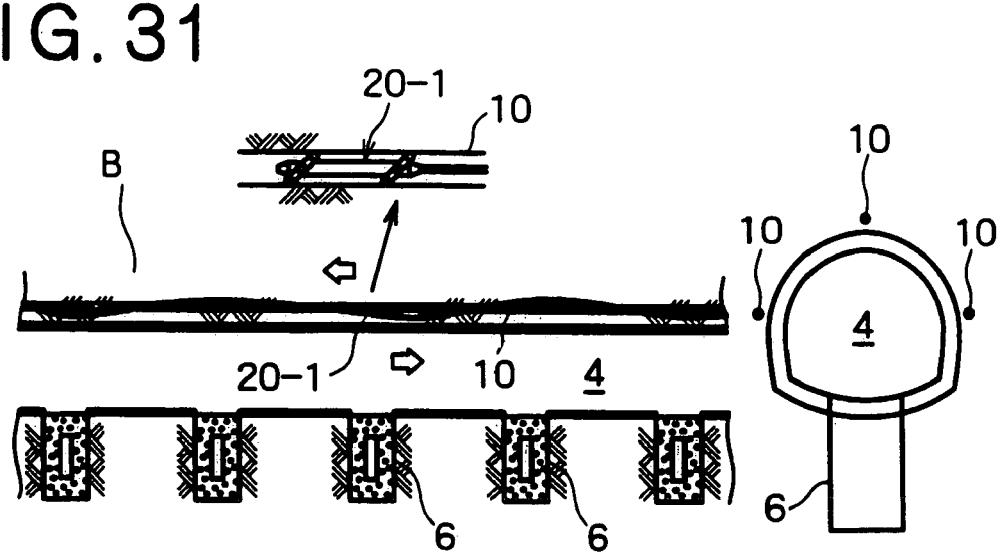
FIG. 31 is a cross-sectional view showing a specific embodiment of monitoring relating to a rock bed (such as displacement of the rock bed) in the gallery monitoring method with the running path and the movable monitoring device according to the present invention.
Figure 32:
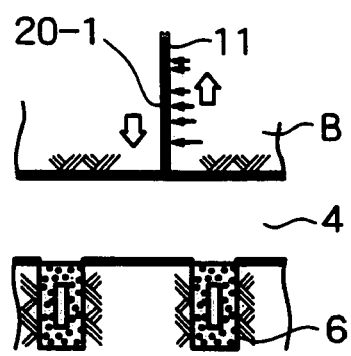
FIG. 32 is a cross-sectional view showing a specific embodiment of monitoring relating to the rock bed (such as strain and/or stress of the rock bed) in the gallery monitoring method with the running path and the movable monitoring device according to the present invention.
Figure 33:
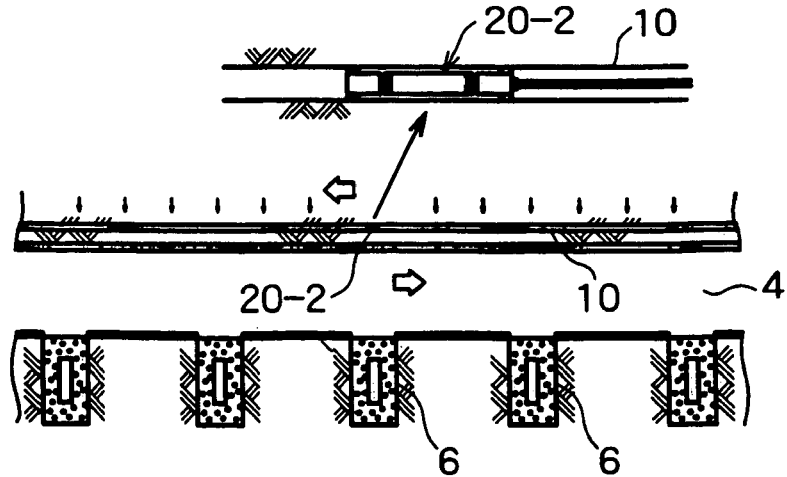
FIG. 33 is a cross-sectional view showing a specific embodiment of monitoring relating to the rock bed (such as composition of the underground water) in the gallery monitoring method with the running path and the movable monitoring device according to the present invention.

FIGS. 31 to 33 show embodiments of monitoring relating to the rock bed in the layout of the vertical disposal-hole pattern shown in FIG. 1. FIG. 31 shows an embodiment of monitoring, in which the monitoring device 20 employs a movable clinometer 20-1. This clinometer 20-1 is horizontally moved within three running tubes 10 (or a single running tube) in parallel to the disposal gallery 4 installed in the rock bed B to ensure that measurement of the displacement of the rock bed in the axial direction of a tunnel is effected. The strain and/or stress of the rock bed may be also calculated from measured data of the displacement.

FIG. 32 shows an embodiment of monitoring wherein the movable clinometer 20-1 is vertically moved within the running tube 11 orthogonal to the disposal gallery 4 installed in the rock bed B to ensure that measurement of the strain and/or stress in a direction orthogonal to the tunnel is effected.

FIG. 33 shows an embodiment of monitoring wherein the monitoring device 20 employs a movable water sampling device 20-2. The device 20-2 is horizontally moved within the running tube 10 to ensure that sampling of the underground water at a predetermined position is effected. After the sampling of the underground water, measurement of the underground water composition is done in a laboratory. It is noted that the running tube 10 may also have a packer, a valve or the like at a predetermined position. Alternatively, direct traveling of a pH meter is also possible.

Figure 34:
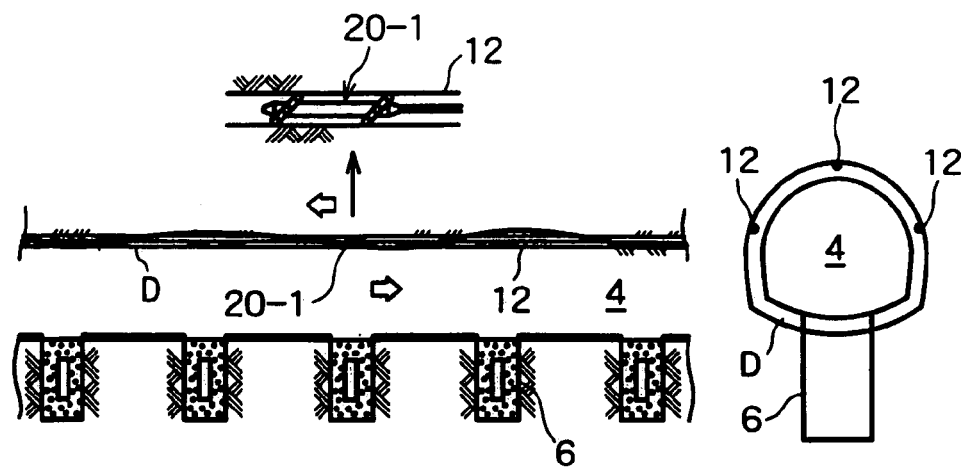
FIG. 34 is a cross-sectional view showing a specific embodiment of monitoring relating to a support (such as displacement of the support) in the gallery monitoring method with the running path and the movable monitoring device according to the present invention.
Figure 35:
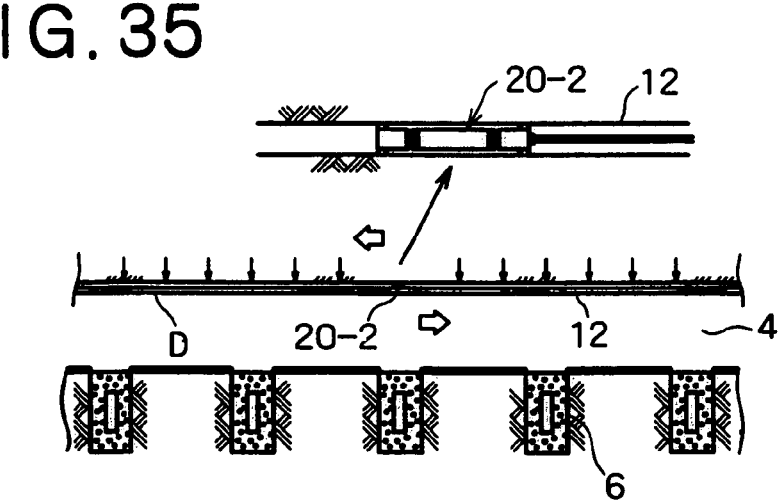
FIG. 35 is a cross-sectional view showing a specific embodiment of monitoring relating to the support (such as composition of water having permeated into the support) in the gallery monitoring method with the running path and the movable monitoring device according to the present invention.
Figure 36:
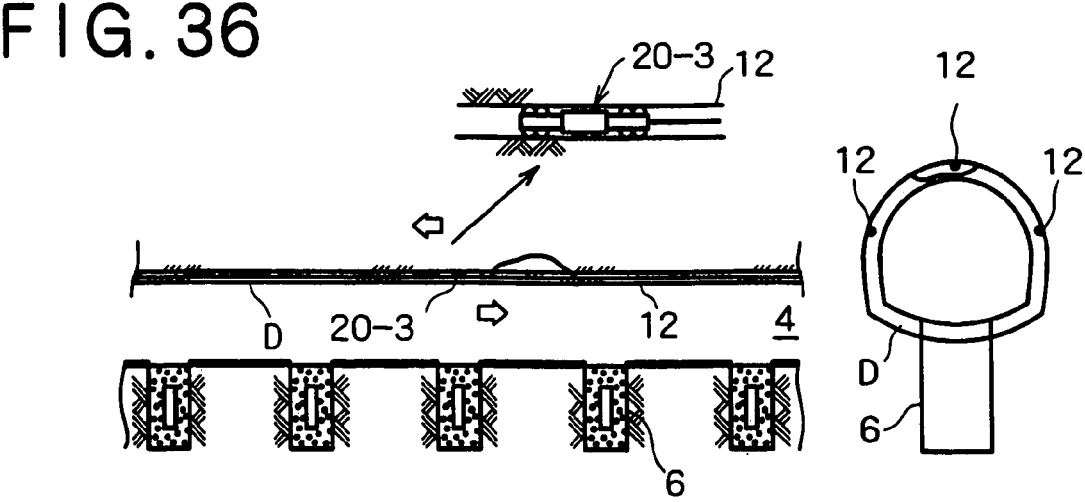
FIG. 36 is a cross-sectional view showing a specific embodiment of monitoring relating to the support (such as measurement of the clearance in a support back) in the gallery monitoring method with the running path and the movable monitoring device according to the present invention.

FIGS. 34 to 36 show embodiments of monitoring relating to the support in the layout of the vertical disposal-hole pattern of FIG. 1. FIG. 34 shows an embodiment of monitoring wherein the monitoring device 20 employs the movable clinometer 20-1 which is horizontally moved within three running tubes 12 (or a single running tube) parallel to the disposal gallery 4 installed within the support D. This ensures that measurement of the displacement of the support in the axial direction of the tunnel is effected. The strain and/or stress of the support may be also calculated from measured data of the displacement.

FIG. 35 shows an embodiment of monitoring wherein the monitoring device 20 employs the movable water sampling device 20-2. The device 20-2 is horizontally moved within the running tube 12 to ensure that sampling of the underground water at a predetermined position is effected. After sampling of the underground water, measurement of the underground water composition is done in the laboratory. In this case, a comparison between the sampled underground water composition and the underground water composition in the ground may be made. It is noted that the running tube 12 may also have a packer, a valve or the like at the predetermined position. Alternatively, direct traveling of the pH meter is also possible.

FIG. 36 shows an embodiment of monitoring wherein the monitoring device 20 employs a movable ultrasonic measuring unit 20-3. The unit 20-3 is horizontally moved within the running tube 12 to ensure that measurement of the clearance in the back of the support D is effected.

Figure 37:
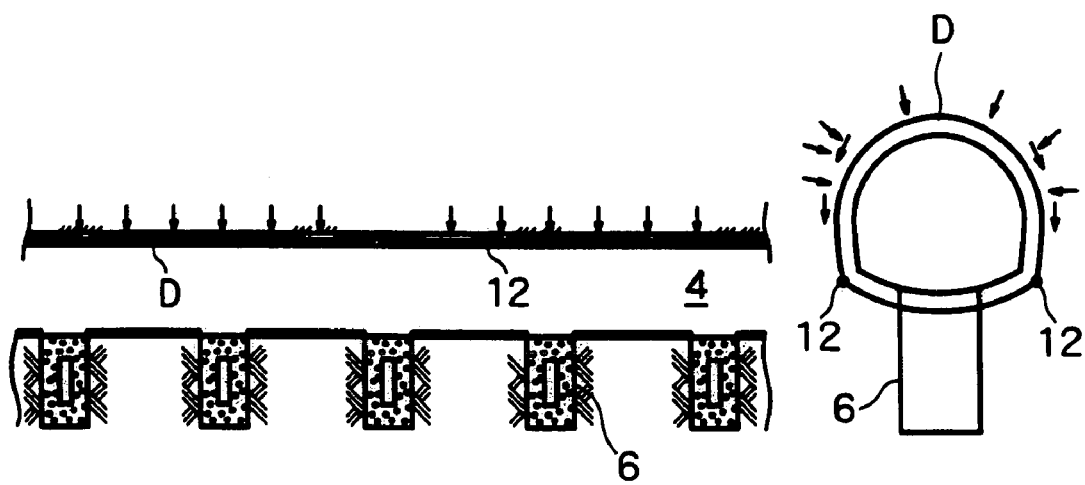
FIG. 37 is a cross-sectional view showing a specific embodiment of different monitoring relating to the support (such as quantity of water having permeated into a drainage sheet) in the gallery monitoring method with the running path and the movable monitoring device according to the present invention.
Figure 38:
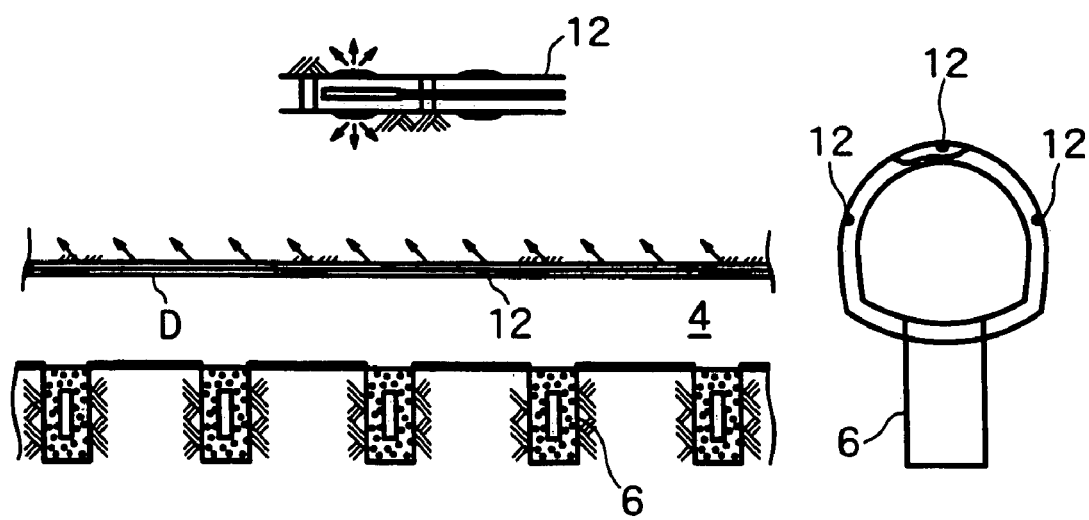
FIG. 38 is a cross-sectional view showing a specific embodiment of maintenance relating to the support (such as how to fill up the clearance) in the gallery monitoring method with the running path and the movable monitoring device according to the present invention.

FIGS. 37 and 38 show different embodiments of monitoring relating to the support. FIG. 37 shows an embodiment, in which two running tubes 12 (or a single running tube), are installed within a secondary lined drainage layer (or a drainage sheet) of the support D to collect the underground water permeating into the drainage layer into the running tube or tubes 12. To that end, the running tube or tubes 12 have water passage holes or the like to ensure that drainage from the end of the disposal gallery 4 takes place. In this case, measurement of the quantity of water and the water composition is also effected.

FIG. 38 shows an embodiment wherein injection of grout takes place under the condition that the running tube 12 is configured as a double packer-type sleeve pipe in advance, when clearances created in the back of the support D during a long-term service thereof make it difficult to maintain the soundness of the disposal gallery 4. The grout may be also used to close the tube. Grout materials such as of cement type and bentonite type are available.

While the above embodiments represent those applied to the stratum disposal field for radioactive wastes shown in FIGS. 46 to 49, the present invention is by no means limited to the above embodiments, and is also applicable to underground disposal for other wastes and to typical tunnel monitoring.

Figure 39:
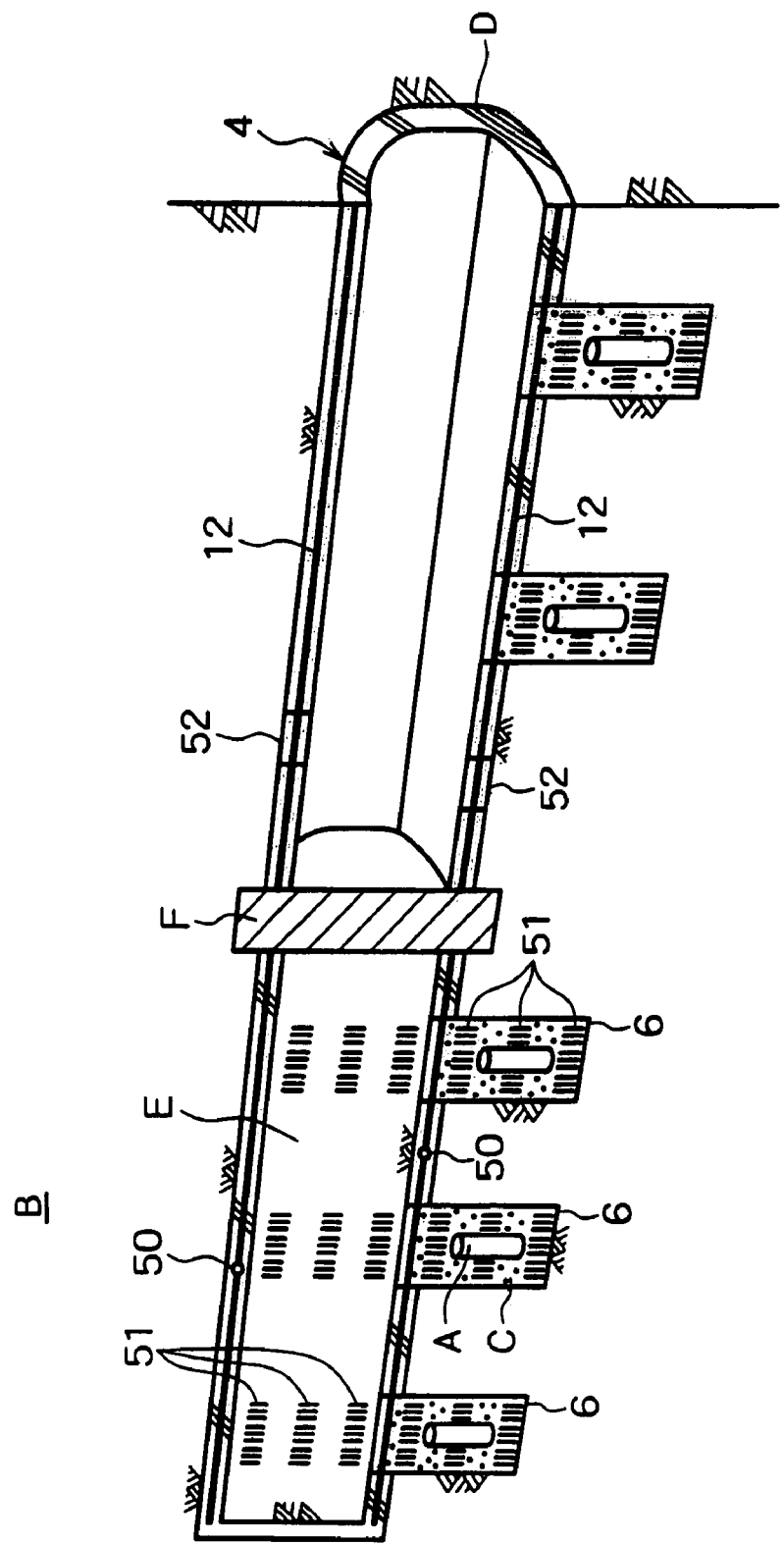
FIG. 39 is a perspective view in cross-section showing an embodiment in a case where a gallery monitoring method with a running path, a movable data collecting device and an underground radio sensor of the present invention is applied to stratum disposal of wastes.

FIGS. 39 and 40 show an embodiment of a gallery monitoring method with a running path, a movable data collecting device and an underground radio sensor. FIG. 39 shows an application of the gallery monitoring method to monitoring in an experimental stage or an experimental field.

FIG. 39 shows an embodiment applied to the layout of the vertical disposal-hole pattern, wherein the running tube 12 in parallel to the axial direction of the disposal gallery 4 is installed within or on the support (such as sprayed concrete and secondary lined concrete) D of the gallery 4, similar to the embodiment of FIG. 1. It is noted that the running tube in parallel to the axial direction of the disposal gallery 4 may be also installed in the rock bed B in the vicinity of the gallery 4, and the running tube at a right angle to the axial direction of the gallery 4 may be also installed in the rock bed B in the vicinity of the gallery 4 (not shown) (See FIG. 1). In addition, the vertically bored disposal holes 6 at the bottom the gallery 4 have therein the over-packs A subjected to underground stationary disposal through the buffer members (such as blended soil mainly containing bentonite) C. It is noted that an inner part of the disposal gallery 4 is refilled with a refilling member E and is also closed up with a plug F.

As shown in FIG. 39, a movable data collecting device 50 is installed within the running tube 12 and monitoring devices 51, such as the underground radio sensors, are embedded in the buffer members C and the refilling member E. Measurement of various data is effected with the sensors of the monitoring devices 51, and the measured data is transmitted by radio to the data collecting device 50 to ensure that the data signal is collected with the data collecting device 51. With the data collecting device 50 being moved within the running tube 12 or fixed in a predetermined position, collection of the data is effected. In addition, the exchange or maintenance of the parts of the data collecting device 50 is also effected by taking out the data collecting device from an exchange/maintenance position 52, as needed.

As shown in FIG. 40, the movable data collecting device 50 comprises of a body 53 with the data collecting equipment incorporated therein and a travel stabilizer 54, such as wheels, rollers and sliders and the like. The body 53 has therein at least a radio receiver of the data collecting equipment.

A moving system of the movable data collecting device 50 is the same as those of the movable monitoring device 20 shown in FIG. 1. Specifically, the moving systems of power cable feed type and battery power supply type using a drive wheel and a drive motor or other types are applicable, as shown in FIGS. 13 to 16. In addition, the data collecting device 50 may also take the various configurations as shown in FIGS. 17 to 22. Transmission of data collected with the data collecting device 50 is also executable with the methods such as transmitting the data to the recording device such as the personal computer through the communication cable, temporarily storing the data in a memory incorporated in the data collecting equipment, and transmitting the data to the recording device by radio, similarly to the movable monitoring device 20 of FIG. 1.

As shown in FIG. 40, the monitoring device 51 including the underground radio sensor is configured so that a power supply 56, a sensor 57 for effecting measurement of various data, a transmitter 58 for transmitting, by radio, the measured data sent from the sensor 57 and the like are housed in an airtight container 55. Radio transmission of signals employs a radio system of electromagnetic wave type with an electromagnetic signal. Other signals such as acoustic or ultrasonic type with a sound signal or the like may be used.

The measured data sent from the sensors 57 located in the ground is collected with the data collecting device 50 that is moved along or fixed in the vicinity of the sensors. In this manner, the barrier (such as the buffer member C and the refilling member E) may be isolated from the water flow. In addition, communication by radio is limited to short-distance communication covering the range of a distance as short as about ten meters, for instance, and would be satisfied with a small-sized communication device that contributes toward size and cost reductions of the monitoring device 51. Further, as long as the power supply, the sensors and the like are also configured as short-term serviceable devices good for about ten year service, a smaller-sized more inexpensive device is applicable, resulting in a suitable application to monitoring at the experimental stage or the experimental field. It is noted that the above device is by no means limited to application to monitoring at the experimental stage, and alternatively, it is also allowable to apply to long-term monitoring, as a matter of course.

Figure 46:
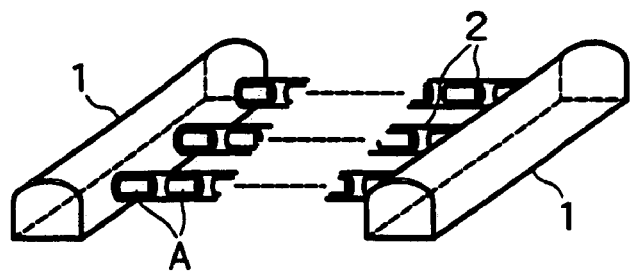
FIG. 46 is a perspective view showing a basic stationary disposal system (of a horizontal disposal-gallery pattern) for stratum disposal of wastes.
Figure 47:
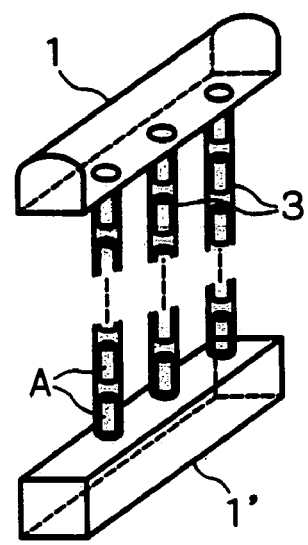
FIG. 47 is a perspective view showing a basic stationary disposal system (of a vertical disposal-vertical shaft pattern) for stratum disposal of wastes.
Figure 48:
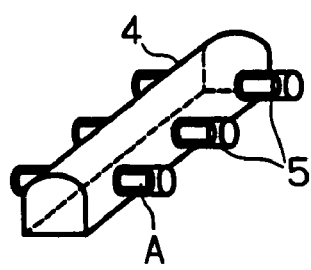
FIG. 48 is a perspective view showing a basic stationary disposal system (of a horizontal disposal-hole pattern) for stratum disposal of wastes.
Figure 49:
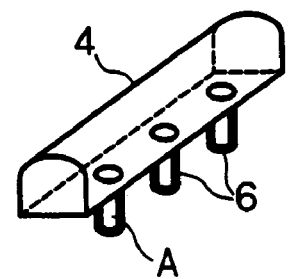
FIG. 49 is a perspective view showing a basic stationary disposal system (of a vertical disposal-hole pattern) for stratum disposal of wastes.
Figure 50:
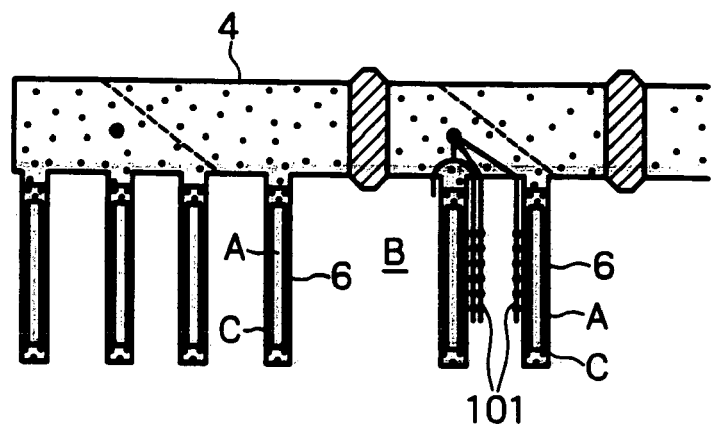
FIG. 50 is a cross-sectional view of a gallery part illustrating a conventional monitoring system in a demonstrative disposal field.
Figure 51:
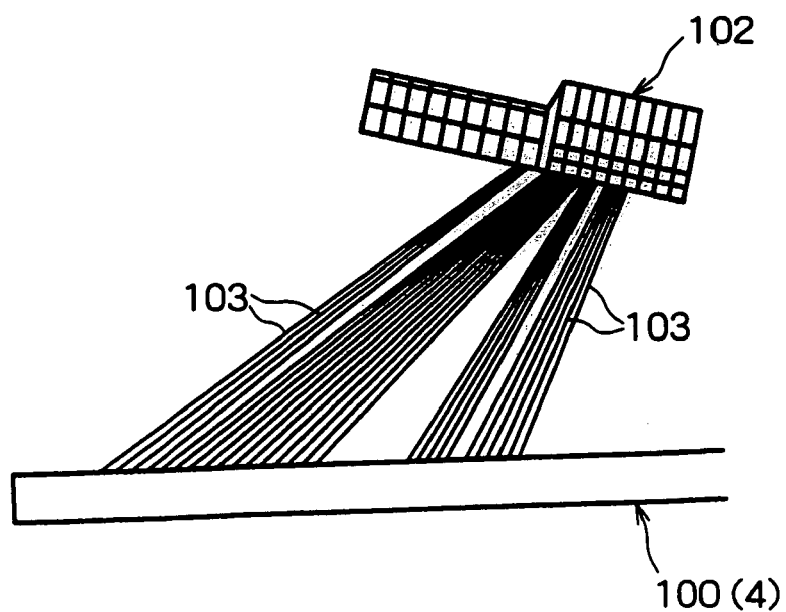
FIG. 51 is a perspective view of an overall configuration of a conventional monitoring system in a demonstrative disposal field.
Figure 52:
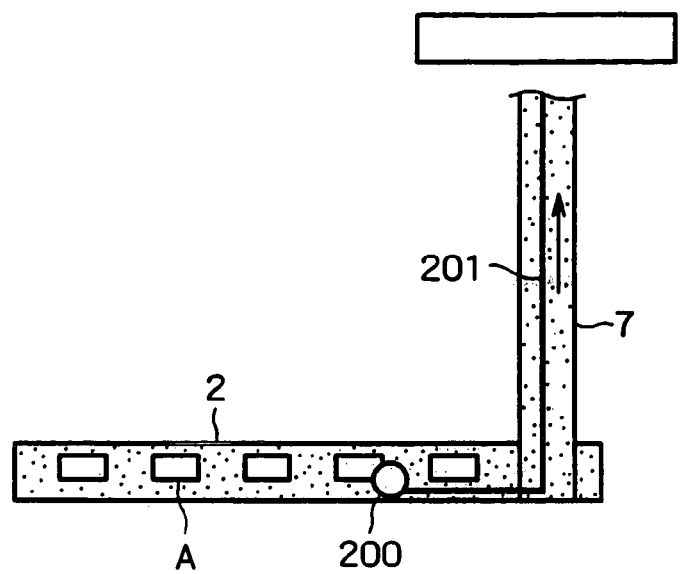
FIG. 52 is a cross-sectional view showing a conventional monitoring system with a communication cable system.
Figure 53:
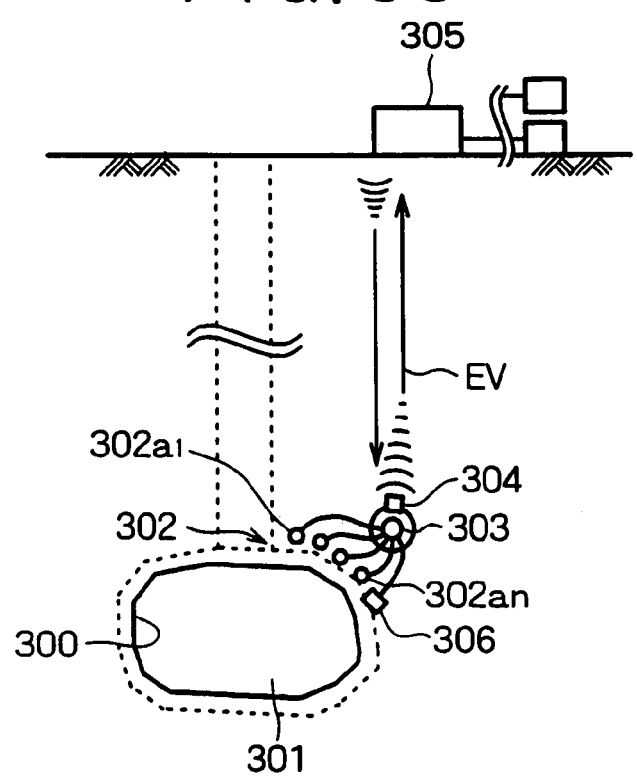
FIG. 53 is a cross-sectional view showing a conventional monitoring system with elastic waves.

While the above embodiments represent those applied to a case where the monitoring device 51 configured by the underground radio sensors are embedded within the buffer member C in the disposal holes 6 and the refilling member E in the disposal gallery 4, the present invention is by no means limited to the above embodiments. Alternatively, the monitoring device 51 may be embedded within the disposal galleries 2 or disposal holes 3 for applications as shown in FIGS. 46 and 47.

The sensor 57 includes a temperature sensor, a pressure sensor, a displacement sensor (clinometer), an ultrasonic sensor, a pH sensor, and is to effect measurement of items such as the temperature and the like of the over-packs A, the temperature, swelling pressure, strain and the like of the buffer member C or the refilling member E, the temperature, displacement, strain, stress, pore water pressure, clearance, gas, potential, underground water chemical data (such as pH, Eh, underground water composition, radioactivity and electric conductivity) and the like of the nearby rock bed, the gallery support or the like.

It is noted that the sensor 57 employs a probe that has excellent corrosion resistance, pressure resistance, radioactive resistance and the like, and this probe is installed at a portion to be detected.

Alternatively, the data collecting device 50 may also have a sensor to ensure that measurement separate from that with the monitoring device 51 is effected. Alternatively, the sensor 57 of the monitoring device 51 may be operated at all times or at regular intervals for saving the power supply 56. Alternatively, the monitoring device 51 and the data collecting device 50 may respectively have a transmitter/receiver to control the sensor 57 in response to a control signal sent to the monitoring device 51.

Although the above embodiment represent those applied to the stratum disposal field for radioactive wastes shown in FIGS. 46 to 49, the present invention is by no means limited to the above embodiments. Specifically, the gallery monitoring method with the running path, the movable data collecting device and the underground radio sensor of the present invention is also applicable to underground disposal for other wastes and to typical tunnel monitoring.

FIGS. 41 to 45 show an embodiment of a monitoring system for stratum disposal wastes with a data radio transmission system of the present invention.

Figure 41:
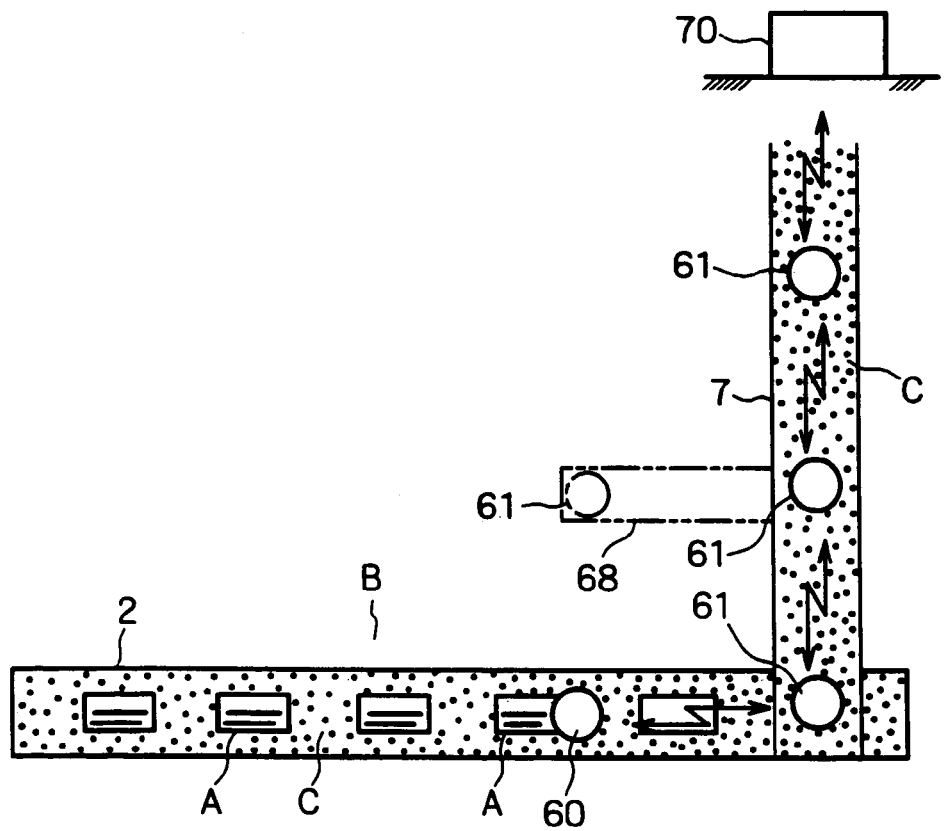
FIG. 41 is cross-sectional view showing an overall configuration of a monitoring system for stratum disposal wastes with a data radio transmission system of the present invention in a case where the monitoring system is applied to stratum disposal of radioactive wastes.
Figure 42:
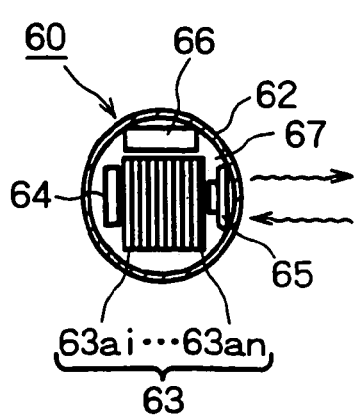
FIG. 42 is a cross-sectional view showing the monitoring device shown in FIG. 41.
Figure 43:
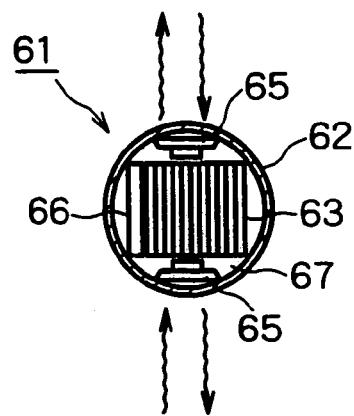
FIG. 43 is a cross-sectional view showing a relay shown in FIG. 41.

FIGS. 41 to 43 show respectively an application of the above monitoring system to the layout of the horizontal disposal-gallery pattern shown in FIGS. 46 to 49. Thus, a large number of horizontally bored disposal galleries 2 are provided in the deep underground part, and the over-packs A are carried from the vertical shaft 7 used as the access gallery communicating with the ground to the disposal galleries through the main gallery, the connecting gallery (not shown) and the like. The over-packs A are then subjected to underground stationary disposal within the disposal galleries 2 at predetermined intervals in the longitudinal direction.

Each disposal gallery 2 is filled with the buffer member (such as blended soil mainly containing bentonite) C. It is noted that the bentonite-contained blended soil of the buffer member C is a material that shows dynamic buffering functions, low permeability, low diffusibility of radioactive material, and has advantages of reducing effects of the rock bed pressure and/or the underground water to retard the migration of nuclides. Upon completion of the works of stationary disposal of the over-packs A, the vertical shaft 7, the main gallery, the connecting gallery and the like are refilled with the refilling member E such as soil.

According to the present invention, in the above stratum disposal field with a monitoring device 60 embedded in the over-pack A within the disposal gallery 2, in the vicinity of the over-pack A or in the rock bed closely contacting the gallery and also with relays 61 embedded at predetermined intervals within the vertical shaft 7, the main gallery, the connection gallery and the like, monitoring of the behavior of the over-packs A and their surroundings is effected, and measured data is transmitted to the ground with a radio system to ensure that long-term monitoring is executed securely.

As shown in FIG. 42, the monitoring device 60 is configured so that a long-life power supply 63, various sensors 64, a transmitter/receiver 65 and a controller 66 are housed in an airtight container 62. As shown in FIG. 43, the relay 61 is configured so that the long-life power supply 63, two transmitters and receivers 65 and 65 and a controller 66 are housed in the airtight container 62.

The airtight container 62 is a container having excellent corrosion resistance, pressure resistance, radioactive resistance and the like. The airtight container 62 preferably needs to withstand corrosion and deterioration for over one hundred years. For instance, materials such as steels, ceramics and hard plastics are used as an airtight container material, and, besides, the air container needs to have a sufficiently large thickness to avoid problems even if corrosion or deterioration occurs. In addition, the above airtight container 62 is charged with inert gas 67 such as nitrogen gas to prevent the internal equipment from being degraded.

The long-life power supply 63 is to operate the internal equipment. The power supply 63 is configured so as to contain a sufficient number of long-life batteries 63a, such as isotope cells and lithium ion batteries, as needed for monitoring for required years.

The sensor 64 includes a temperature sensor, a pressure sensor, a displacement sensor (clinometer), an ultrasonic sensor, a pH sensor and the like, and ensures that measurement of the following items is effected.

The temperature and the like of the over-packs A.

The temperature, swelling pressure, strain and the like of the buffer members C.

Temperature, displacement, strain, stress, pore water pressure, clearance, gas, potential, underground water chemical data (such as pH, Eh, underground water composition, radioactivity, electric conductivity) and the like of the nearby rock bed, the gallery support or the like.

The sensor body is housed in the airtight container 62, so that a probe having excellent corrosion resistance, pressure resistance, radioactive resistance and the like is required. Then, the probe is integrally connected to the airtight container 62 so that a tip end part of the probe is disposed at a portion to be detected.

The transmitter/receiver 65 of the monitoring device 60 is to transmit the measured data sent from the sensor 64 with the radio system, and also to receive a control signal sent from a management device of the ground facilities to the sensor 64 with the radio system. The relay 61 is configured so that the measured data signal or the control signal received with one transmitter/receiver 65 is transmitted with the other transmitter/receiver 65.

The radio transmission of signals employs a radio system of electromagnetic wave type with an electromagnetic signal of acoustic or ultrasonic wave type with a sound signal or the like. The transmission of the radio system of electromagnetic wave type (such as a magnetic signal, for instance) is limited in propagation distance (as short as several tens of meters) due to underground attenuation. To prevent the above attenuation, it is necessary to take measures such as installation of a large number of relays 61 according to the propagation distance and use of a low frequency bandwidth ensuring relatively small attenuation.

While the relays 61 are installed in the vertical shaft 7 and the like at intervals of a distance at which data communication is executable without fail, it is also possible to install the relays 6 in a leased space in the rock bed such as a hole 68 obtained by horizontally boring from the vertical shaft 7. It is noted that the management device 70 is by no means limited to that installed on the ground, and alternatively, it is also possible to install the management device in the ground or in a space constructed in the ground.

The controller 66 of the monitoring device 60 has a control board, a memory and the like, and is to store measured data in the memory for control of the transmission of the measured data sent from the transmitter/receiver 65 and also to control the sensor 64 in response to the control signal sent from the ground facilities. The sensor 64 may be operated at all times or at regular intervals for saving the power supply 63.

The controller 66 of the relay 61 has a control board and the like and is to transmit the measured data and the control signal received with one transmitter/receiver 65 from the other transmitter/receiver 65 after execution of the required processing such as noise removal and signal correction.

The management device 70 has a signal transmitter/receiver, a data processor, a data output device, a data input device and the like. The device 70 is configured to calculate the measured data through the processing of the received signal for storage and/or output of the data and also to output the sensor control signal.

Figure 44:
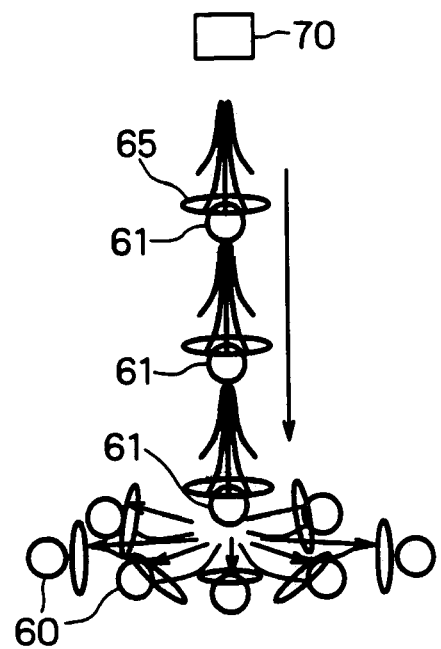
FIG. 44 is a perspective view showing a condition of transmission of signals (from the ground to the underground) in the monitoring system shown in FIG. 41.
Figure 45:
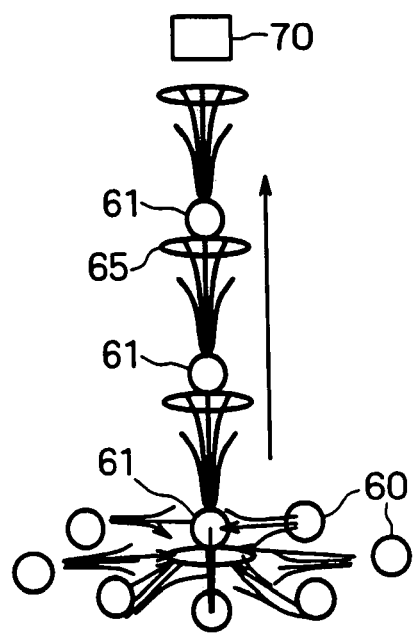
FIG. 45 is a perspective view showing a condition of transmission of signals (from the underground to the ground) in the monitoring system shown in FIG. 41.

In the above configuration, the control signal from the management device 70 on the ground facilities is transmitted with the radio system to the monitoring device 60 at each location via a large number of relays 61 to ensure that the measurement of the above various items is effected continuously or at regular intervals after the disposal field has been completely closed up in such a way as to refill the vertical shaft 7 and the like, as shown in FIGS. 44 and 45. The measured data is transmitted with the radio system from the monitoring device 60 to the management device 70 on the ground facilities via the large number of relays 61 to ensure that long-term monitoring is executable securely.

Because of the elimination of the communication cable unlike the conventional monitoring systems, there is no fear that the communication cable leads to the water passage and further to the selective migration route of nuclides, resulting in no damage to security of the disposal field.

In addition, the monitoring device and the relay are configured so that the long-life power supply 63, the transmitter/receiver 65 and the controller 66 or the sensor 64 and the like are housed in the airtight container 62. The container 62 is excellent in corrosion resistance, pressure resistance and the like and is charged with the inert gas, thereby providing a structure that is good for a long-term service and withstands the corrosion, deterioration and the like over a long period of time under the underground high-temperature/high-pressure environment. Thus, long-term monitoring is executable securely.

It goes without saying that the present monitoring system is of course applicable to monitoring for the over-packs, the rock bed and the like before closure of the disposal field.

While the above embodiments represent those applied to the underground disposal field with the disposal gallery and the vertical shaft, the present monitoring system is also applicable to an underground disposal field of other types.

In addition, the monitoring system for stratum disposal wastes with the data radio transmission system of the present invention is by no means limited to the above stratum disposal field for the radioactive wastes, and alternatively, it is also allowable to apply to underground disposal for other wastes.

According to the gallery monitoring method with the running path and the movable monitoring device of the present invention, monitoring of the rock bed, the gallery support or the like is effected along the running path which may be installed in the vicinity of the gallery, in the nearby rock bed, within or on the gallery support or the like. Thus, monitoring is executable over a wide range with the single monitoring device, the small number of pieces of the monitoring equipment is applicable to monitoring of a large number of items at many locations, and a substantial reduction of the number of sensors, drilled holes and communication cables is attainable, as compared with the conventional monitoring method, resulting in a substantial cost reduction.

In addition, the monitoring device may be easily taken out, so that the exchange or maintenance of the sensors, the communication cables and the like is facilitated, permitting long-term monitoring with accuracy.

According to the gallery monitoring method with the running path, the movable data collecting device and the underground radio sensor of the present invention, the running path installed in the rock bed around the gallery, in the gallery support or the like has installed therein the data collecting device. Such arrangement ensures that various data relating to the rock bed, the gallery support, the fillers in the disposal spaces or in the gallery or the like is measured by the monitoring device and is then transmitted by radio to the data collecting device for collection of the measured data. Thus, the substantial reduction of the number of drilled holes and communication cables is attainable, as compared with as in a case of the prototype disposal field in Sweden, resulting in the substantial cost reduction.

In addition, transmission of the measured data from the monitoring device to the data collecting device by radio ensures that the artificial barrier such as the buffer member and the refilling member is prevented from having the water passage (such as the communication cable and the running tube) and that the presence of any selective migration route of nuclides and the like is eliminated, resulting in no damage to security of the disposal field. In addition, the monitoring device is located relatively close to the data collecting device of the running path, communication by radio is limited to short-distance communication covering the range of a distance as short as about ten meters, for instance, and would be thus satisfied with the small-sized communication device that contributes toward size and cost reductions of the monitoring device.

According to the monitoring system for stratum disposal wastes with the data radio transmission system of the present invention, the measured data from the monitoring device installed in the disposal space for the wastes is transmitted to the management device on the ground or somewhere else via the relay with the radio system of electromagnetic or sound wave type or the like. This ensures that monitoring is executed in the management device. Thus, there is no fear that the communication cable leads to the water passage and further to the selective migration route of nuclides, unlike the conventional communication cable system, resulting in no damage to security of the disposal field.

In addition, transmission of data via the relay with the radio system of electromagnetic or acoustic wave type or the like ensures that the measured data is surely transmitted even under the ground after closure of the disposal field. Further, the monitoring device and the relay are of the structure that is good for the long-term service and withstands the corrosion, deterioration and the like over a long period of time under the underground high-temperature/high-pressure environment, with the result that long-term monitoring of the behavior of the wastes and their surroundings is executable securely.

The invention claimed is:

1. In a system for effecting various kinds of monitoring for wastes subjected to underground stationary disposal within a disposal space constructed in the ground, a monitoring system for stratum disposal wastes, comprising:

a monitoring device installed within the disposal space or a rock bed nearby the disposal space;
a relay installed within a vertical shaft, a gallery or a bored hole; and
a management device installed on or in the ground;
wherein said monitoring device accommodates, in an airtight container, a power supply and a transmitter/receiver for transmitting, by radio, measured data sent from a sensor and receiving, by radio, a control signal sent from the management device, said relay is remote of each of said monitoring device and said management device and accommodates, in an airtight container, a power supply and a transmitter/receiver for effecting, by radio only, relay of signals sent from the monitoring device and the management device, said relay further including means for noise removal and signal correction of relayed signals sent to the monitoring device and the management device, said management device includes a signal transmitter/receiver, a data processing device, a data output device and a data input device, and said system is configured to allow said monitoring device to transmit, by radio, the measured data of items relating to the over-pack, the rock bed or the gallery support, said relay to effect the relay of said data signal, and said management device to receive said data signal.

2. The monitoring system stratum disposal wastes according to claim 1, wherein the electromagnetic waves, sound waves or ultrasonic waves are used for data signal transmission.

3. The monitoring system for stratum disposal wastes according to claim 1 or 2, wherein said airtight container is charged with inert gas.

4. The monitoring system for stratum disposal wastes according to claim 1 or 2, wherein a disposal gallery used for underground stationary disposal of over-packs at intervals in a longitudinal direction or more than one disposal hole provided along the gallery for underground stationary disposal of the over-packs is applied to said disposal space.

5. The monitoring system for stratum disposal wastes according to claim 4, wherein the monitoring device is installed in the vicinity of the over-pack to ensure that measurement of items relating to the over-pack, the rock bed or the gallery support is effected.

6. The monitoring system for stratum disposal wastes according to claim 1 or 2, wherein the relay is installed within a vertical shaft.

7. The monitoring system for stratum disposal wastes according to claim 1, wherein a plurality of said relays are provided at suitable spacings within said vertical shaft, gallery or bored hole to provide radio transmission of data between said monitoring device and said management device after said disposal space is closed and said vertical shaft is refilled.

8. The monitoring system for stratum disposal wastes according to claim 1 or 7, wherein said relay includes a control board to transmit the measured data and the control signal received from the transmitter/receiver following noise removal and signal correction.

9. The monitoring system for stratum disposal wastes according to claim 1 or 7, wherein said monitoring device includes a control board and a memory for storing data to control the transmission of the measured data sent from the transmitter/receiver of the monitoring device and to control the sensor in response to a control signal sent from the management device.

* * * * *